United States Patent
Miller et al.

(10) Patent No.: US 11,231,253 B2
(45) Date of Patent: *Jan. 25, 2022

(54) SYSTEM AND METHOD FOR NETWORKING FIREARM-MOUNTED DEVICES

(71) Applicant: T-Worx Holdings, LLC, Sterling, VA (US)

(72) Inventors: Tyler Miller, Dickerson, MD (US); Ben Feldman, Reston, VA (US); Joseph Ellena, Herndon, VA (US); Martin Fisher, Annapolis, MD (US); Wayne Taylor, Ashburn, VA (US); Gary Callsen, Ashburn, VA (US)

(73) Assignee: T-Worx Holdings, LLC, Sterling, VA (US)

(*) Notice: Subject to any disclaimer, the term of this patent is extended or adjusted under 35 U.S.C. 154(b) by 240 days.

This patent is subject to a terminal disclaimer.

(21) Appl. No.: 16/578,504

(22) Filed: Sep. 23, 2019

(65) Prior Publication Data

US 2020/0124383 A1 Apr. 23, 2020

Related U.S. Application Data

(63) Continuation of application No. 15/980,512, filed on May 15, 2018, now Pat. No. 10,458,754.

(Continued)

(51) Int. Cl.
*F41G 11/00* (2006.01)
*F41C 23/22* (2006.01)
(Continued)

(52) U.S. Cl.
CPC ............ *F41G 11/003* (2013.01); *F41C 23/22* (2013.01); *F41C 27/00* (2013.01); *F41G 3/02* (2013.01);
(Continued)

(58) Field of Classification Search
CPC .................................. F41G 11/00; F41J 5/10
See application file for complete search history.

(56) References Cited

U.S. PATENT DOCUMENTS

| 566,917 A | 9/1896 | Le Blanc |
| 4,533,980 A | 8/1985 | Hayes |
| (Continued) | | |

FOREIGN PATENT DOCUMENTS

EP    2781875 A2    9/2017

OTHER PUBLICATIONS

Third Party Submission Under 37 CFR 1.99.
(Continued)

*Primary Examiner* — J. Woodrow Eldred
(74) *Attorney, Agent, or Firm* — Merchant & Gould P.C.

(57) ABSTRACT

An electronic system for a firearm includes a power source, one or more electrical conductors electrically connected to receive power from the power source, and a plurality of electronic devices. Each electronic device has an electrical input configured to receive power from the one or more electrical conductors to power the electronic device. A communication device is configured for data communication across the one or more electrical conductors. A method of communicating between electronic devices connected to a firearm includes powering a plurality of electronic devices connected to a firearm from a power source through one or more electrical conductors, and communicating data between the plurality of electronic devices across the one or more electrical conductors.

22 Claims, 18 Drawing Sheets

Related U.S. Application Data

(60) Provisional application No. 62/506,533, filed on May 15, 2017.

(51) Int. Cl.

| | | |
|---|---|---|
| *F41G 3/02* | (2006.01) | |
| *F41C 27/00* | (2006.01) | |
| *F41J 5/10* | (2006.01) | |
| *F41G 3/16* | (2006.01) | |
| *F41G 1/38* | (2006.01) | |
| *F41G 1/36* | (2006.01) | |
| *F41G 3/06* | (2006.01) | |
| *F41G 1/35* | (2006.01) | |
| *F41A 3/66* | (2006.01) | |

(52) U.S. Cl.
CPC ............... *F41G 3/165* (2013.01); *F41J 5/10* (2013.01); *F41A 3/66* (2013.01); *F41G 1/35* (2013.01); *F41G 1/36* (2013.01); *F41G 1/38* (2013.01); *F41G 3/065* (2013.01)

(56) References Cited

U.S. PATENT DOCUMENTS

| | | | |
|---|---|---|---|
| 4,595,809 A | 6/1986 | Pool | |
| 4,777,861 A | 10/1988 | Lecuyer et al. | |
| 4,883,932 A | 11/1989 | Van Hout et al. | |
| 4,931,605 A | 6/1990 | Zoller | |
| 5,033,219 A | 7/1991 | Johnson et al. | |
| 5,142,806 A | 9/1992 | Swan | |
| 5,347,910 A | 9/1994 | Avila et al. | |
| 5,360,949 A | 11/1994 | Duxbury | |
| 5,579,165 A | 11/1996 | Michel et al. | |
| 5,669,174 A | 9/1997 | Teetzel | |
| 5,822,905 A | 10/1998 | Teetzel | |
| 5,826,363 A | 10/1998 | Olson | |
| 6,163,131 A | 12/2000 | Gartstein et al. | |
| 6,237,271 B1 | 5/2001 | Kaminski | |
| 6,237,462 B1 | 5/2001 | Hawkes et al. | |
| 6,269,730 B1 | 8/2001 | Hawkes et al. | |
| 6,499,382 B1 | 12/2002 | Lougheed et al. | |
| 6,618,976 B1 | 9/2003 | Swan | |
| 6,622,416 B2 | 9/2003 | Kim | |
| 6,925,744 B2 | 8/2005 | Kincel | |
| 6,931,775 B2 | 8/2005 | Burnett | |
| 6,965,085 B1 | 11/2005 | Orrico et al. | |
| 6,973,865 B1 | 12/2005 | Duselis et al. | |
| 7,144,830 B2 | 12/2006 | Hill et al. | |
| 7,243,454 B1 | 7/2007 | Cahill | |
| 7,255,035 B2 | 8/2007 | Mowers | |
| RE40,216 E | 4/2008 | Swan | |
| 7,421,818 B2 | 9/2008 | Houde-Walter | |
| 7,464,495 B2 | 12/2008 | Cahill | |
| 7,525,203 B1 | 4/2009 | Racho | |
| 7,548,697 B2 | 6/2009 | Hudson et al. | |
| 7,559,169 B2 | 7/2009 | Hung et al. | |
| 7,562,483 B2 | 7/2009 | Hines | |
| 7,584,569 B2 | 9/2009 | Kallio et al. | |
| 7,627,975 B1 | 12/2009 | Hines | |
| 7,640,690 B2 | 1/2010 | Hines | |
| 7,676,975 B2 | 3/2010 | Phillips et al. | |
| 7,712,241 B2 | 5/2010 | Teetzel et al. | |
| 7,818,910 B2 | 10/2010 | Young | |
| 7,827,726 B2 | 11/2010 | Stokes | |
| 7,841,120 B2 | 11/2010 | Teetzel et al. | |
| 7,866,083 B2 | 1/2011 | Teetzel | |
| 7,921,761 B1 | 4/2011 | Quinn | |
| 7,954,971 B2 | 6/2011 | Kincaid et al. | |
| 7,975,419 B2 | 7/2011 | Darian | |
| 8,001,715 B2 | 8/2011 | Stokes | |
| 8,042,967 B2 | 10/2011 | Hikmet et al. | |
| 8,047,118 B1 | 11/2011 | Teetzel et al. | |
| 8,091,265 B1 | 1/2012 | Teetzel et al. | |
| 8,100,044 B1 | 1/2012 | Teetzel et al. | |
| 8,141,288 B2 | 3/2012 | Dodd et al. | |
| 8,146,282 B2 | 4/2012 | Cabahug et al. | |
| 8,151,505 B2 | 4/2012 | Thompson | |
| 8,297,173 B1 | 10/2012 | Teetzel et al. | |
| 8,322,064 B2 | 12/2012 | Cabahug et al. | |
| 8,397,418 B2 | 3/2013 | Cabahug et al. | |
| 8,402,683 B2 | 3/2013 | Cabahug et al. | |
| 8,443,539 B2 | 5/2013 | Cabahug et al. | |
| 8,448,368 B2 | 5/2013 | Cabahug et al. | |
| 8,453,369 B1 | 6/2013 | Kincaid et al. | |
| 8,516,731 B2 | 8/2013 | Cabahug et al. | |
| 9,140,509 B2 | 9/2015 | Sullivan et al. | |
| 9,217,616 B2 | 12/2015 | Sullivan et al. | |
| D749,184 S | 2/2016 | Sakiewicz et al. | |
| 9,250,035 B2 | 2/2016 | Sullivan et al. | |
| 9,285,185 B2 | 3/2016 | Cabahug et al. | |
| 9,335,109 B2 | 5/2016 | Bensayan et al. | |
| 9,472,971 B2 | 10/2016 | Soar | |
| 9,506,723 B2 | 11/2016 | Teetzel et al. | |
| 9,591,255 B2 | 3/2017 | Sakiewicz et al. | |
| 10,006,742 B1 | 6/2018 | Campbell | |
| 2002/0129535 A1 | 9/2002 | Osborn, II | |
| 2002/0180866 A1 | 12/2002 | Monroe | |
| 2003/0010190 A1 | 1/2003 | Sammut et al. | |
| 2005/0241206 A1 | 11/2005 | Teetzel et al. | |
| 2008/0010890 A1 | 1/2008 | Vice et al. | |
| 2008/0025028 A1 | 1/2008 | Gloisten et al. | |
| 2008/0039962 A1 | 2/2008 | McRae | |
| 2008/0040965 A1 | 2/2008 | Solinsky et al. | |
| 2008/0063400 A1 | 3/2008 | Hudson et al. | |
| 2008/0134562 A1 | 6/2008 | Teetzel | |
| 2008/0170838 A1 | 7/2008 | Teetzel et al. | |
| 2008/0190002 A1 | 8/2008 | Hines | |
| 2009/0044439 A1 | 2/2009 | Phillips et al. | |
| 2009/0108589 A1 | 4/2009 | Racho | |
| 2009/0255160 A1 | 10/2009 | Summers | |
| 2010/0031552 A1 | 2/2010 | Houde-Walter | |
| 2010/0083553 A1 | 4/2010 | Montgomery | |
| 2010/0180485 A1 | 7/2010 | Cabahug et al. | |
| 2010/0192443 A1 | 8/2010 | Cabahug et al. | |
| 2010/0192444 A1 | 8/2010 | Cabahug et al. | |
| 2010/0192446 A1 | 8/2010 | Darian | |
| 2010/0192448 A1 | 8/2010 | Darian | |
| 2010/0218410 A1 | 9/2010 | Cabahug et al. | |
| 2010/0242332 A1 | 9/2010 | Teetzel et al. | |
| 2011/0000120 A1 | 1/2011 | Thompson | |
| 2011/0010979 A1 | 1/2011 | Houde-Walter | |
| 2011/0061284 A1 | 3/2011 | Cabahug et al. | |
| 2011/0120438 A1 | 5/2011 | Samuels et al. | |
| 2011/0126622 A1 | 6/2011 | Turner | |
| 2011/0162251 A1 | 7/2011 | Houde-Walter | |
| 2011/0168777 A1 | 7/2011 | Bay | |
| 2011/0173865 A1 | 7/2011 | Compton et al. | |
| 2011/0214328 A1 | 9/2011 | Williams | |
| 2011/0283585 A1 | 11/2011 | Cabahug et al. | |
| 2012/0097741 A1 | 4/2012 | Karcher | |
| 2012/0144716 A1 | 6/2012 | Cabahug et al. | |
| 2012/0192476 A1 | 8/2012 | Compton et al. | |
| 2013/0061504 A1 | 3/2013 | Malherbe et al. | |
| 2013/0104439 A1 | 5/2013 | Hines | |
| 2013/0133510 A1 | 5/2013 | Piazza et al. | |
| 2013/0145670 A1 | 6/2013 | Kuhlman | |
| 2013/0185978 A1 | 7/2013 | Dodd et al. | |
| 2014/0047754 A1 | 2/2014 | Compton et al. | |
| 2014/0110482 A1 | 4/2014 | Bay | |
| 2014/0360077 A1 | 12/2014 | Miller et al. | |
| 2015/0020427 A1 | 1/2015 | Compton et al. | |
| 2015/0026588 A1 | 1/2015 | Turcotte et al. | |
| 2015/0041538 A1 | 2/2015 | Teetzel et al. | |
| 2015/0115880 A1* | 4/2015 | Soar | H02J 50/12 320/108 |
| 2015/0300775 A1 | 10/2015 | Combs | |
| 2015/0300786 A1 | 10/2015 | Downing et al. | |
| 2016/0018185 A1 | 1/2016 | Makohon | |
| 2016/0061560 A1 | 3/2016 | Saadon | |

(56) References Cited

U.S. PATENT DOCUMENTS

2016/0216082 A1 7/2016 Downing
2016/0377383 A1 12/2016 Downing et al.

OTHER PUBLICATIONS

PCT International Searching Authority, International Search Report and Written Opinion, dated Aug. 29, 2018, 14 pages.
European Patent Office; Extended European Search Report for Application No. 18803168.6 dated Feb. 22, 2021, 8 pages.

* cited by examiner

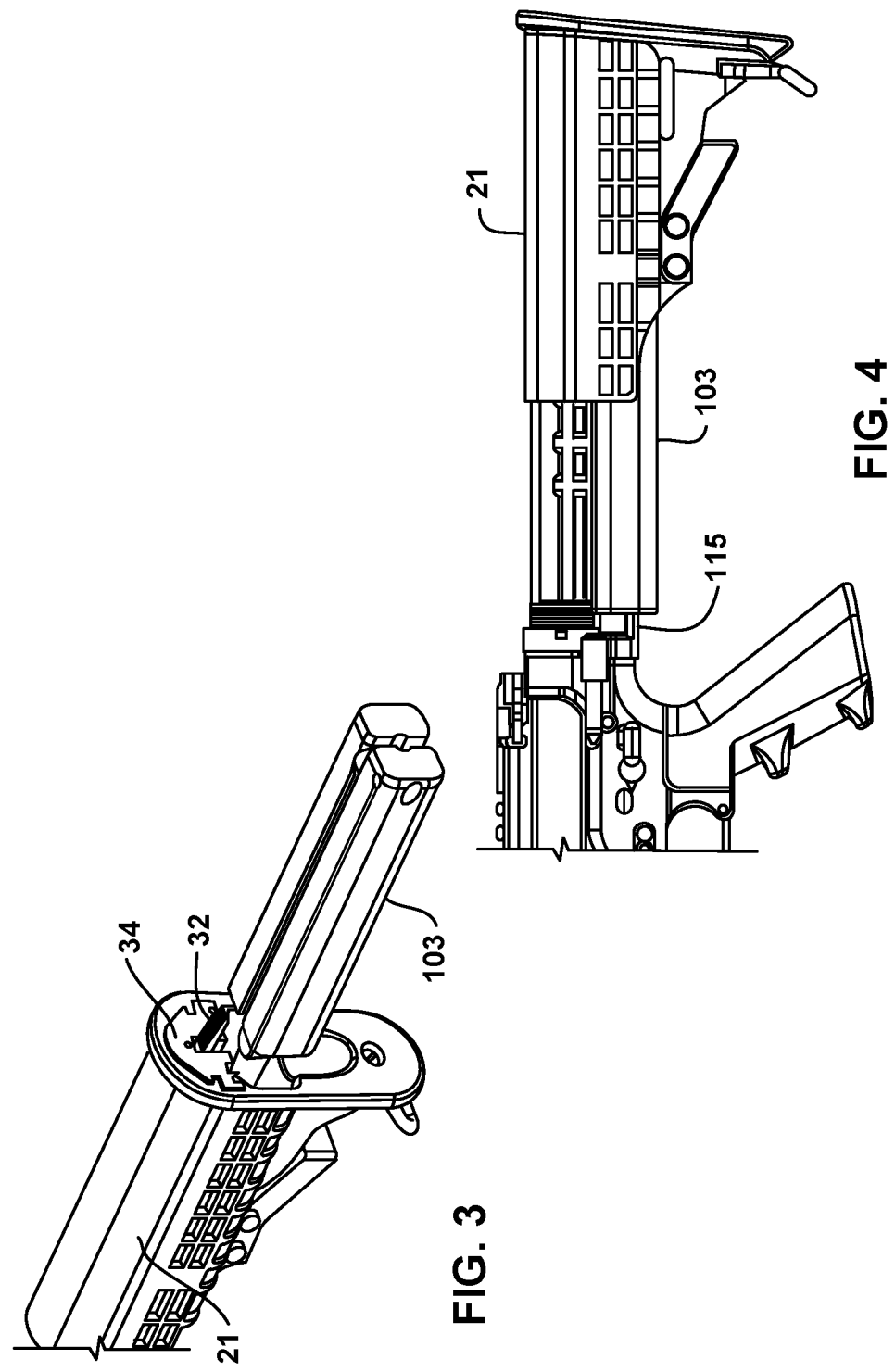

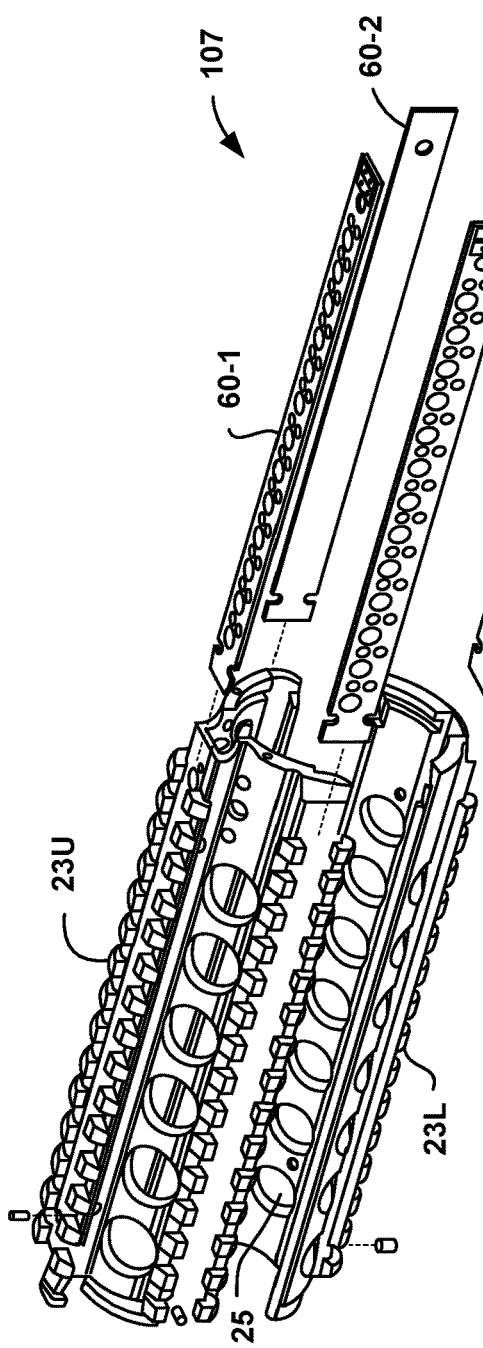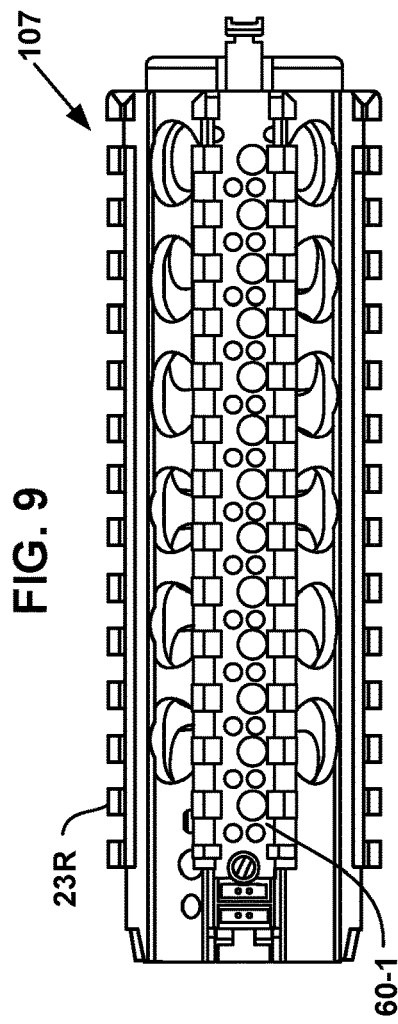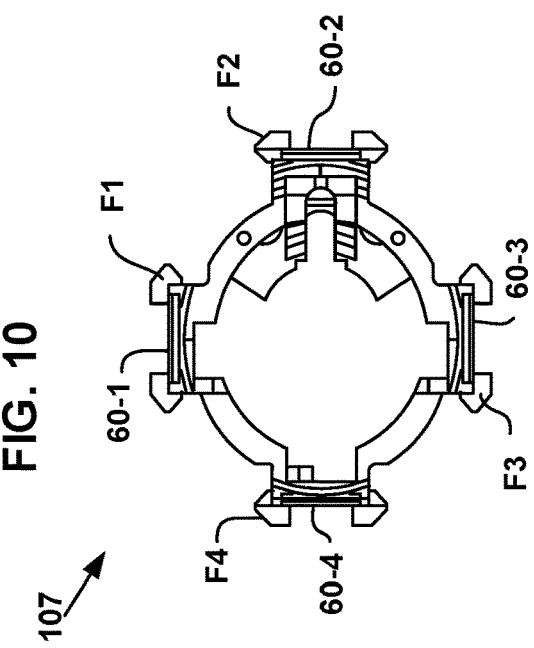

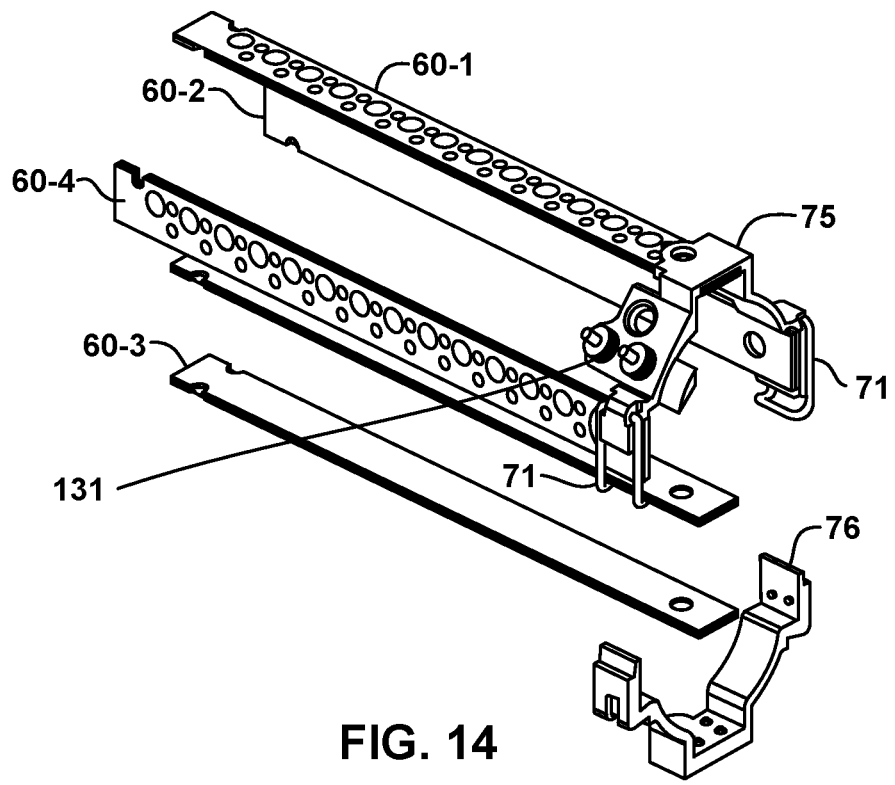
FIG. 14
FIG. 15
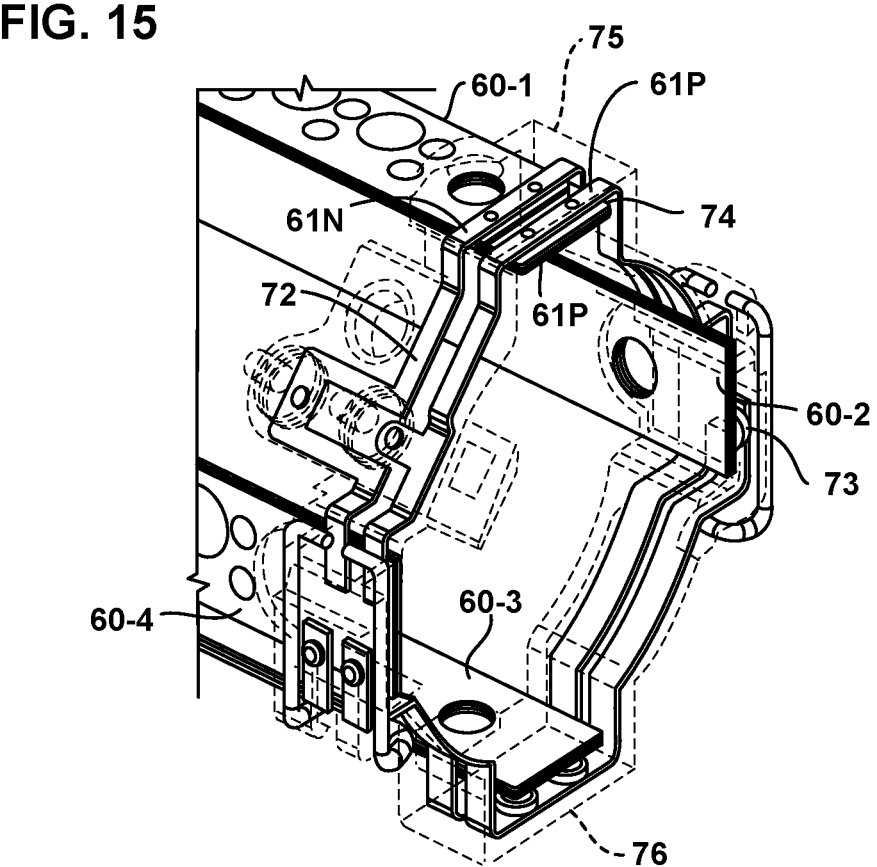

SYSTEM AND METHOD FOR NETWORKING FIREARM-MOUNTED DEVICES

CROSS-REFERENCE TO RELATED APPLICATIONS

This application is a continuation of U.S. patent application Ser. No. 15/980,512, filed on May 15, 2018, entitled SYSTEM AND METHOD FOR NETWORKING FIREARM-MOUNTED DEVICES, which claims priority to U.S. Provisional Patent Application No. 62/506,533, filed May 15, 2017, entitled SYSTEM AND METHOD FOR NETWORKING FIREARM-MOUNTED DEVICES, AND VIDEO CAPTURE AND TRANSMISSION FROM A FIREARM, the disclosures of which are hereby incorporated by reference herein in their entireties.

INTRODUCTION

Electronic devices such as lights, cameras, laser range finders, infrared sensors, displays, and radios are often added to firearms to improve the situational awareness of the firearm user. However, these electronic firearm devices generally cannot interoperate and communicate with one another. Hence, there is a need for a secure and reliable communication system and method that allows electronic firearm devices to communicate with one another and to external devices for improving a firearm user's situational awareness.

SUMMARY

In one aspect, the present disclosure relates generally to a system for networking firearm-mounted devices to one another and to an external device. In another aspect, the present disclosure relates to video capture and transmission from a firearm.

In one aspect, the disclosed technology relates to an electronic system for a firearm. The electronic system includes a power source; one or more electrical conductors connected to receive power from the power source; and a plurality of electronic devices connected to the one or more electrical conductors. Each electronic device includes an electrical input configured to receive power from the one or more electrical conductors; and a communication device configured for data communication across the one or more electrical conductors.

In some examples, the electronic system further includes a controller node powered by the power source and configured to control the plurality of electronic devices. In some examples, the controller node is configured to communicate data from the plurality of electronic devices to a portable electronic device. In some examples, the power source comprises AA batteries. In some examples, the electronic system is included in a firearm.

In another aspect, the disclosed technology relates an intelligent rail system for a firearm. The intelligent rail system includes a power source; one or more electrical conductors electrically connected to receive power from the power source, at least part of the one or more electrical conductors being arranged on a rail; and a plurality of electronic devices, at least one electronic device is mounted to the rail. Each electronic device has an electrical input configured to receive power from the one or more electrical conductors to power the electronic device; and a communication device for data communication across the one or more electrical conductors.

In some examples, the intelligent rail system further includes a controller node powered by the power source and configured to communicate data across the one or more electrical conductors. In some examples, the controller node includes user adjustable switches. In some examples, the controller node is configured to transmit data from the plurality of devices to an external device. In some examples, the external device is a portable electronic device. In some examples, the controller node is configured to control power supply to the electronic devices. In some examples, the power source comprises AA batteries. In some examples, the intelligent rail system is included in a firearm.

In another aspect, the disclosed technology relates to a method of communicating between electronic devices connected to a firearm. The method includes: powering a plurality of electronic devices connected to a firearm from a single power source through one or more electrical conductors; and communicating data between the plurality of electronic devices across the one or more electrical conductors.

In some examples, the method further includes communicating data from the one or more electrical conductors to an external device. In some examples, the data communicated to the external device comprises a video stream captured from a video camera connected to the firearm.

In some examples, the method further includes embedding data from a first electronic device into a data stream of second electronic device. In some examples, the method further includes encapsulating the data in a packet structure of a communication protocol.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings.

FIG. 3 is an isometric view of a power source for the power distribution system.

FIG. 4 is a side view of the power source for the power distribution system.

FIG. 8 is an exploded view of a handguard structure including the intelligent rail.

FIG. 9 is a top view of the handguard structure including the intelligent rail.

FIG. 10 is an end view of the handguard structure including the intelligent rail.

FIG. 14 is an exploded view of an electrical interconnection for the intelligent rail.

FIG. 15 is an assembled view of an electrical interconnection for the intelligent rail.

DETAILED DESCRIPTION

Figure 1:
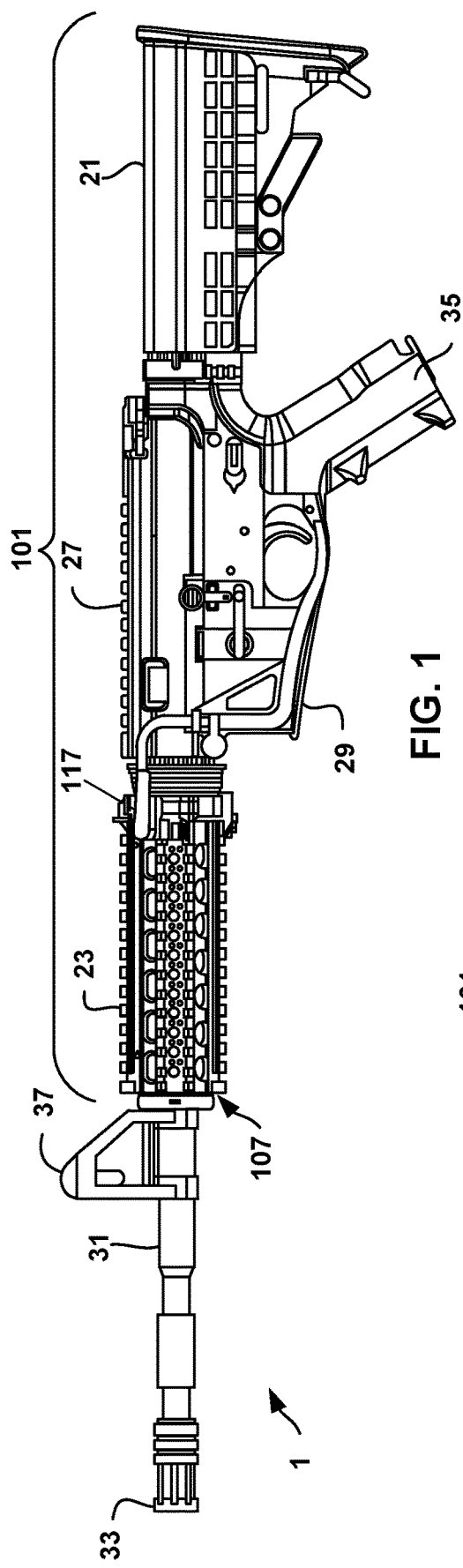
FIG. 1 is a side view of a firearm with a power distribution system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
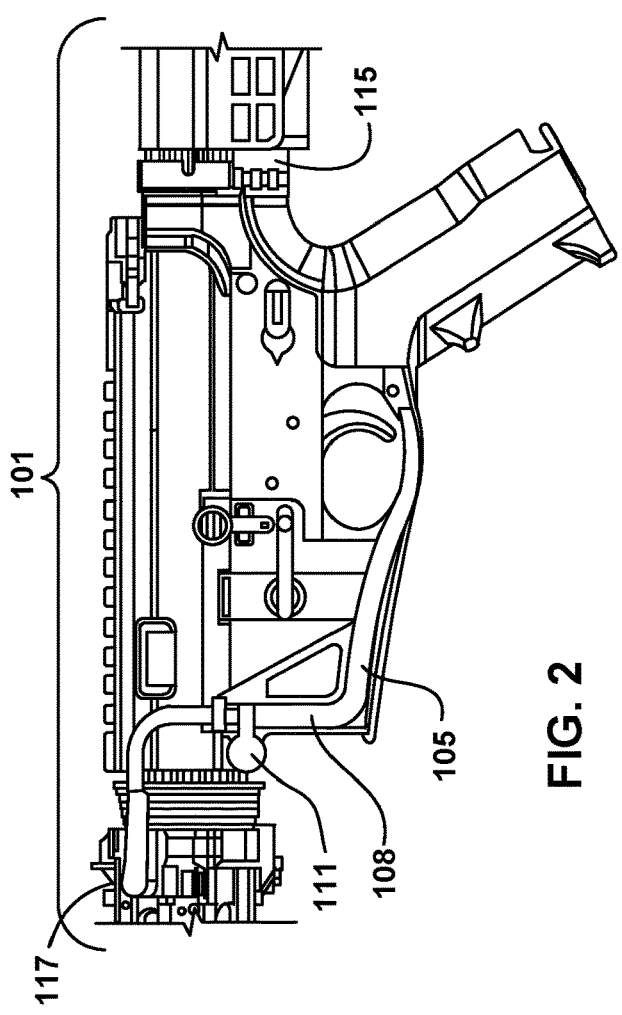
FIG. 2 is a detailed side view of the firearm with the power distribution system.

FIG. 1 is a side view of a firearm 1 with a power distribution system 101. FIG. 2 is a detailed side view of the firearm 1 with the power distribution system 101. As shown in FIGS. 1 and 2, the firearm 1 includes a buttstock 21, a handguard 23, an upper receiver 27, a lower receiver 29, a barrel 31, a muzzle 33, a grip 35, and a front sight 37. While a military-style firearm is described herein, the power distribution system 101 can be added to a firearm, such as the firearm 1, as described herein as well as to other types of firearms, such as handguns, fixed-mount machine guns, bolt action rifles, etc.

The handguard 23 shrouds the barrel 31 of the firearm 1 to enable a user to grip the forward portion of the firearm 1. The handguard 23 mitigates the possibility of burning the user's hand when firing the firearm 1, while also providing adequate cooling for the barrel 31 of the firearm 1. The handguard 23 partially shields the barrel 31 like traditional Picatinny Rail.

The power distribution system 101 includes a power source 103 (shown in FIGS. 3 and 4), a power connector 105, an intelligent rail 107, and one or more electronic firearm devices 300 (shown in FIGS. 16 and 17) configured for attachment to the intelligent rail 107.

The handguard 23 and intelligent rail 107 are attached together to form a handguard structure which encircles the barrel 31 of the firearm 1. As used throughout this disclosure, the term "handguard structure" represents the sections of the handguard 23 and the intelligent rail 107 which encircle the barrel 31 as shown in FIG. 1. The intelligent rail 107 in effect forms facets around the periphery of the resultant handguard structure.

In alternative examples, there is no requirement to include the handguard 23 as an integral component of the power distribution system 101. As such, the handguard 23 is optional, and the intelligent rail 107 can be attached to the firearm 1 in some other manner, such as by being attached to a rail on the upper receiver 27.

FIGS. 3 and 4 show the power source 103 of the power distribution system 101. In the example shown in FIGS. 3 and 4, the power source 103 is mounted inside a cavity 34 of the buttstock 21, and is a removable battery pack. In alternative examples, the power source 103 can be implemented in a number of assemblies and mounted on various portions of the firearm (such as in the handguard 23, in a pistol grip, or in a remote power source, and the like).

The buttstock 21 includes a cam latch 32 for holding the power source 103. The buttstock 21 allows the power source 103 to be installed and removed through the rear of the firearm 1. The length of the buttstock 21 is adjustable such that the buttstock 21 can be extended in various multiple intermediate positions to provide an adjustable length of the firearm 1. By moving the mass of the power source 103 to the rear on the firearm 1, the time to bring the firearm 1 to point, and to "stop" the muzzle when a target is acquired, are reduced.

Referring back to FIGS. 1 and 2, the power source 103 is electrically connected to the intelligent rail 107 via a wire routed inside a durable and impact resistant polymer shroud 108 that conforms to the lower receiver 29. The shroud 108 is securely retained by a quick connect/disconnect pivot and takedown pin 111. The wire in the shroud 108 runs from a power socket 115 at the power source 103 to a power rail connector 117 (shown in more detail in FIGS. 5-7). This configuration provides an easy access for replacing or repairing the cable assembly of the power distribution system 101, and eliminates snag hazards or interferences with the firearm's operation, and requires no modification of the lower receiver 29.

Figure 5:
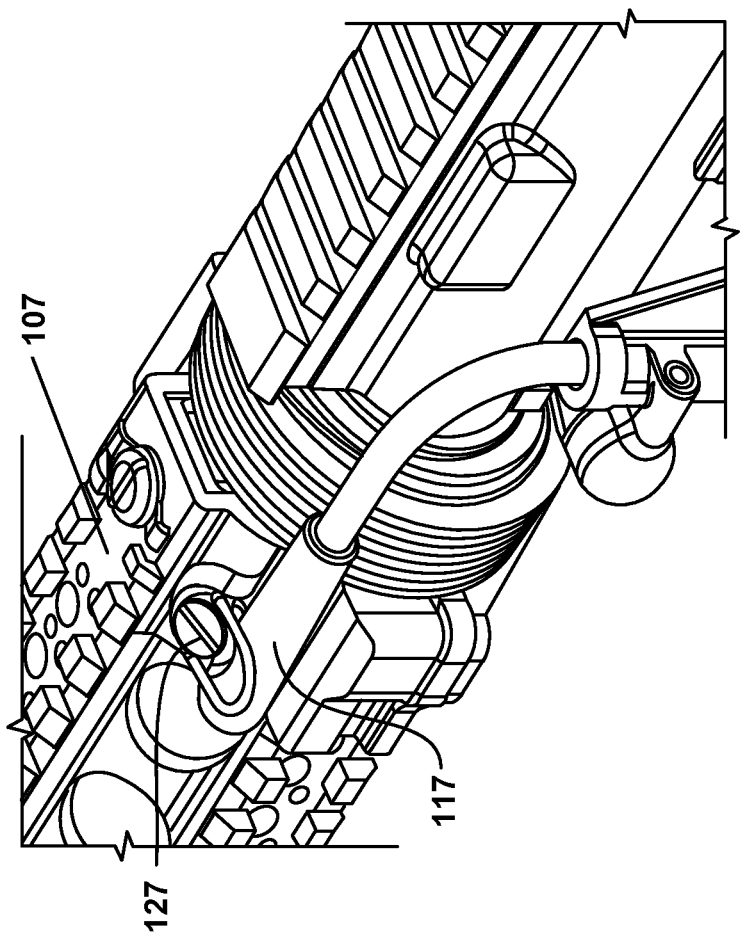
FIG. 5 is an isometric view of an interconnection of a power rail connector to an intelligent rail in the power distribution system of the firearm.
Figure 6:
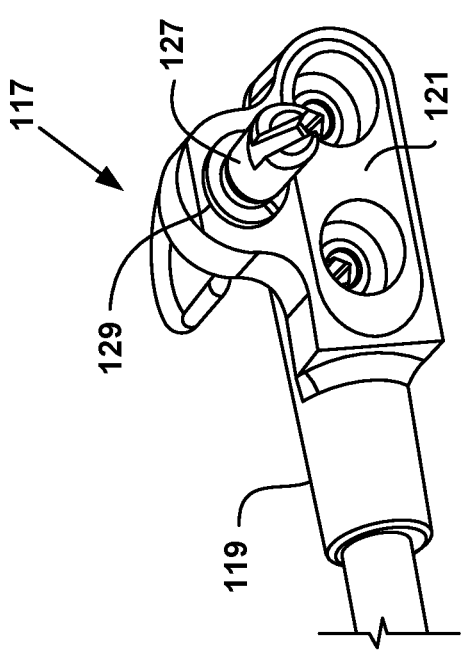
FIG. 6 is an isometric view of the power rail connector.
Figure 7:
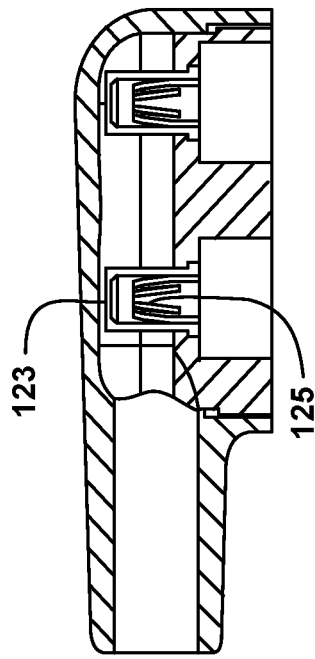
FIG. 7 is a cross-sectional view of the power rail connector.

FIG. 5 is an isometric view of an interconnection of the power rail connector 117 to the intelligent rail 107. FIG. 6 is an isometric view of the power rail connector 117. FIG. 7 is a cross-sectional view of the power rail connector 117. As shown in FIGS. 5-7, the power rail connector 117 has a housing 119 and ruggedized power rail connector 121 where sealing integrity is maintained during exposure to adverse environmental conditions. The power rail connector 117 includes a metallic shell body, contact pin receptacle 123, with a multi-finger spring contact 125 assembled into the contact pin receptacle 123. The multi-finger spring contact 125 complies to variations in rail pin contacts 131 (shown in FIG. 15) to ensure continuous current carrying capacity. The contact pin receptacle 123 includes a solder tail portion for soldering cable wires. A fastener 127 and retaining ring 129 can be used to secure the power rail connector 117 into the rail pin contacts 131 for supplying power to the intelligent rail 107.

The intelligent rail 107 electrically interconnects the power source 103 with various electronic firearm devices that can be mounted onto the intelligent rail 107. In some examples, the intelligent rail 107 can provide both mechanical support and electrical power to each firearm device. In these examples, the intelligent rail 107 can be attached to and be coextensive with the handguard 23 sections, such that the mounting of a power-consuming electronic firearm device on the intelligent rail 107 results in simultaneous mechanical and electrical interconnection.

FIG. 8 is an exploded view of the handguard structure including the intelligent rail 107. FIG. 9 is a top view of the handguard structure including the intelligent rail 107. As shown in FIGS. 8 and 9, the handguard structure includes a series of ridges with a T-shaped cross-section interspersed with flat "locking slots". In this example, the handguard structure is a modified Picatinny Rail which has milling slots along the length of the mechanical accessory attachment points 23R in the upper handguard section 23U and the lower handguard section 23L in order to install one or more power distribution printed circuit boards 60-1 . . . 60-4.

FIG. 10 is an end view of the handguard structure including the intelligent rail 107. FIG. 10 shows the slots formed in the various facets F1-F4 of the intelligent rail 107. As with a Picatinny Rail, apertures 25 (shown in FIG. 8) are provided along the length of the intelligent rail 107 to enable the barrel 31 of the firearm 1 to be cooled by air circulation from the ambient environment. Other intelligent rail configurations are possible, and the configuration shown in FIGS. 8-10 is provided as one example of the power distribution system 101.

One or more of the printed circuit boards 60-1 . . . 60-4 can be inserted into the respective slots formed in the intelligent rail 107, such as on the corresponding facets F1 . . . F4 of the handguard 23, thereby enabling power-consuming electronic firearm devices 300 to be attached to the handguard 23 via the intelligent rail 107 and to be powered by a corresponding printed circuit board 60-1 . . . 60-4 of the intelligent rail 107.

Figure 11:
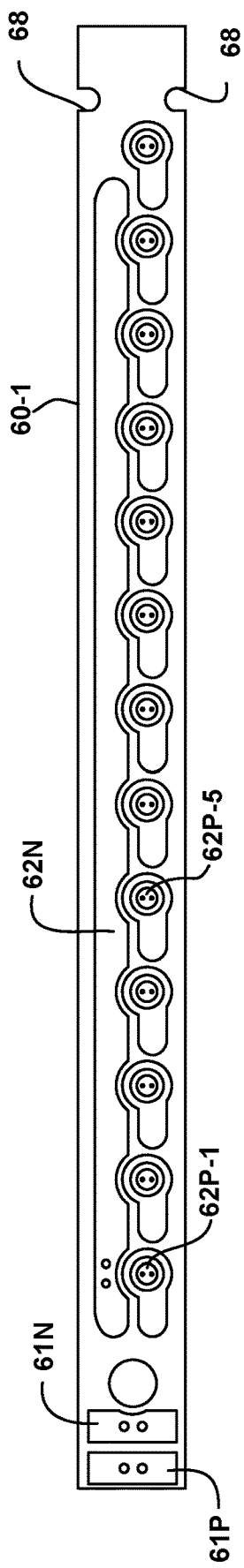
FIG. 11 is a plan view of a printed circuit board of the intelligent rail.
Figure 12:
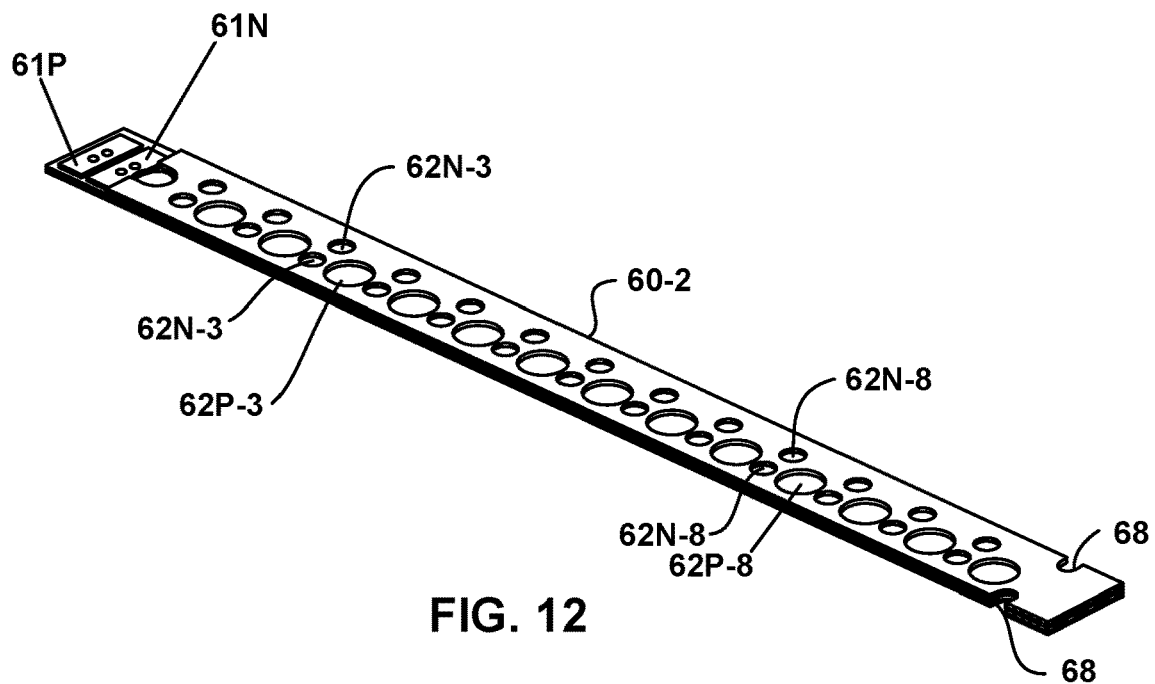
FIG. 12 is an isometric view of a printed circuit board of the intelligent rail.

FIG. 11 is a plan view of a printed circuit board 60-1 of the intelligent rail 107. FIG. 12 is an isometric view of another printed circuit board 60-2 of the intelligent rail 107. FIGS. 11 and 12 illustrate the architecture of the printed circuit boards 60-1 and 60-2 where power is applied via the positive connector contact 61P and the negative connector contact 61N. Power is routed by electrical traces on the printed circuit boards 60-1 and 60-2. The positive current from positive connector contact 61P is routed to the center of the printed circuit board where it is switched via operation of a switch (such as the snap dome switch 64 shown in FIG. 13) to contact 62P-5, while the negative current from the negative connector contact 61N is routed to a negative bus 62N (shown in the printed circuit board 60-1 of FIG. 11) or negative bus contact pads such as negative bus contact pads 62N-3, 62B-8 (shown in the printed circuit board 60-2 of FIG. 12). In the example printed circuit boards 60-1, 60-2 depicted in FIGS. 11 and 12, notches 68 are points of attachment which can be used to secure the printed circuit boards 60-1, 60-2 in a corresponding slot of the intelligent rail 107 via a pin clip arrangement.

In the example printed circuit boards 60-1, 60-2 of FIGS. 11 and 12, there are thirteen positions where a power-consuming electronic firearm device can be attached to contact the power contacts of the intelligent rail 107. For example, there are thirteen positive contacts 62P-1 to 62P-13. Also, as described above, in some examples, a continuous negative bus 62N is provided as the other power source connection (e.g., FIG. 11), and in other examples, negative power source connections are provided by individual negative bus contact pads 62N-1 to 62N-13 (e.g., FIG. 12). In other examples, there could be more than thirteen positions or fewer than thirteen positions where a power-consuming electronic firearm device can be attached to the intelligent rail 107, and the number of attachment points may vary as needed or required.

The positive contacts 62P-1, 62P-5 and negative contacts 62N-3, 62N-8 can be continuously powered, such as in the case where only one set of contacts is provided. In other examples, the positive contacts 62P-1, 62P-5 and the negative contacts 62N-3, 62N-8 can be switch activated by snap dome switches 64 placed over the positive and negative contacts.

The snap dome switches 64 can each have a pair of conductive contacts which are normally in the open mode. When the cover of the metallic snap dome switch 64 is depressed via a projection on the exterior surface of the power-consuming electronic firearm device, the conductive contacts mate and provide an electrical connection. The snap dome switches 64 have a curved metal dome that spans the positive and negative contacts such that when depressed, the dome snaps downward to electrically bridge the contacts. The positive contacts 62P and the negative contacts 62N can both be implemented using a low reflectivity contact.

Figure 13:
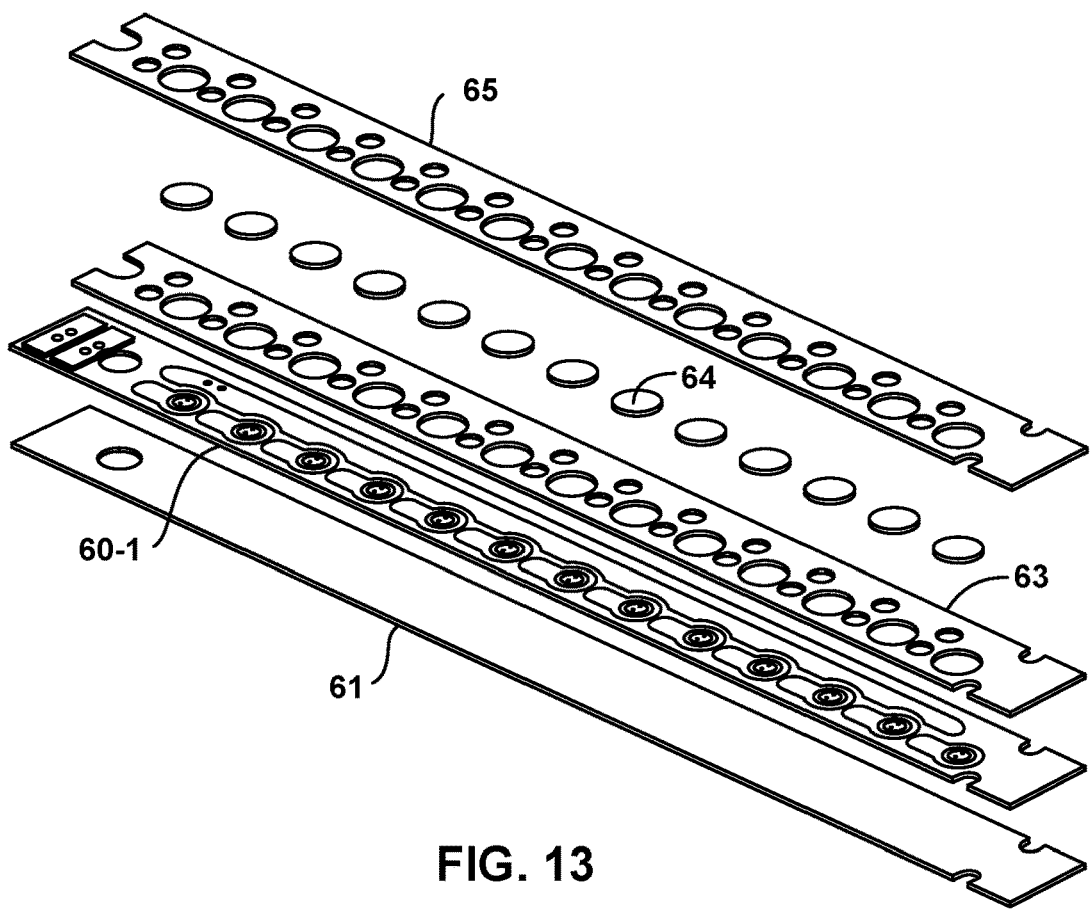
FIG. 13 is an exploded isometric view of a printed circuit board.

FIG. 13 illustrates an exploded view of a power distribution printed circuit board assembly where a non-conductive layer 61 prevents the metal firearm rail from electrically shorting the power distribution printed circuit board 60-1. Spacer layer 63 is a non-conductive element which holds the snap dome switches 64 in place so they do not move laterally during assembly. Snap dome switches 64 provide the electrical switching action to the mounted rail devices. Top cover layer 65 provides environmental protection to the printed circuit board 60-1 and the snap dome switches 64 when the aforementioned layers are assembled.

FIGS. 14 and 15 show the printed circuit boards 60-1 to 60-4 soldered to interconnected conductive busses 72, 74. As shown in FIG. 14, the power rail connector 117 can be pressed into rail pin contacts 131 in the conductive buses 72, 74. Retaining clips 71 made from a resilient metallic spring material are anchored on an upper rail connector 75, and are used to securely hold the upper rail connector 75 together with a lower rail connector 76.

Figure 16:
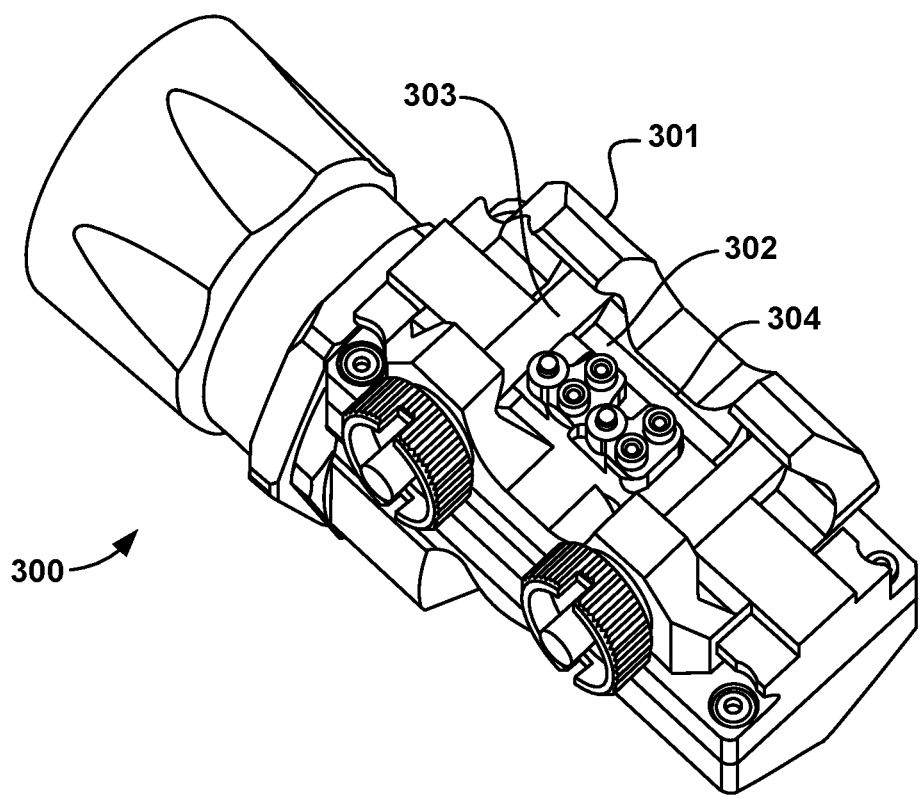
FIG. 16 is a bottom isometric view of an electronic firearm device.

FIG. 16 is a bottom isometric view of an electronic firearm device 300. The electronic firearm device 300 has a rail grabber 301, spring contacts 302, spring plungers 303, and face seals 304. The spring plungers 303 depress the snap dome switches 64, the spring contacts 302 provide electrical contact with the fixed electrical bus contacts 62N and 62P on the intelligent rail 107, and the face seals 304 provide environmental protection.

Figure 17:
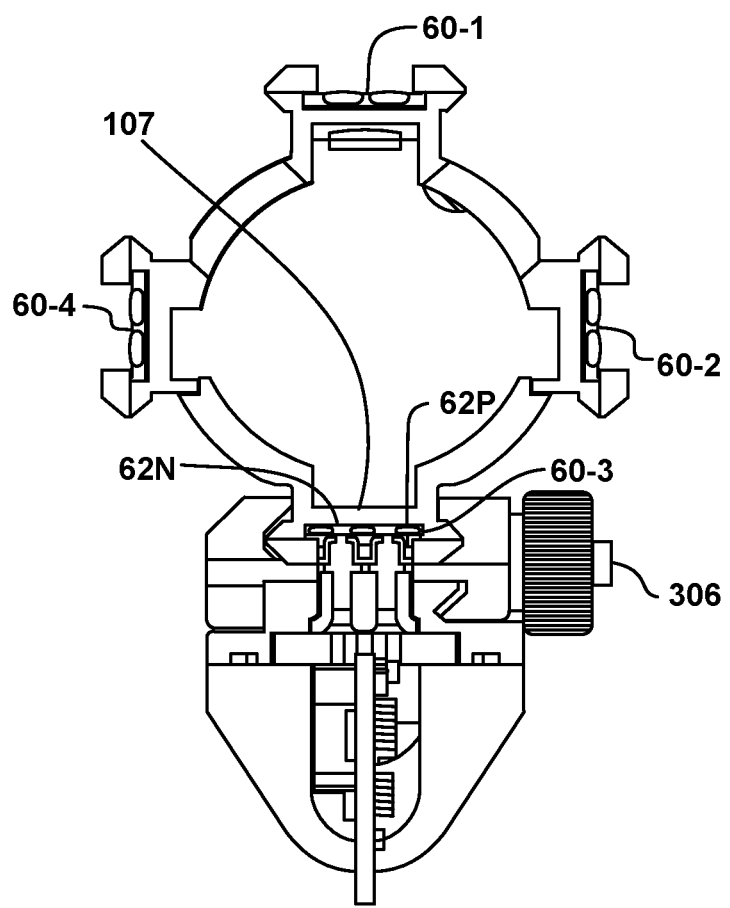
FIG. 17 is a cross-sectional view of the electronic firearm device connected to the intelligent rail.

FIG. 17 is a cross-sectional view of the electronic firearm device 300 connected to the intelligent rail 107. The electronic firearm device 300 can be mechanically attached to the intelligent rail 107 via a screw clamp 306 as shown. As described above, the electronic firearm device 300 includes a pair of spring contacts 302 which contact corresponding low reflectivity contacts 62N and 62P mounted on the printed circuit board 60-3. Similarly, the electronic firearm device 300 has a spring plunger 303 which contacts a corresponding snap dome switch 64 mounted on printed circuit board 60-3.

A challenge of mounting the electronic firearm device 300 to the intelligent rail 107 is that it may not readily interoperate with other electronic firearm devices on the intelligent rail 107, which may use different communication protocols. Thus, the following describes a secure and reliable packet based communication system and method for electronic firearm devices, such as the electronic firearm device 300, and including but not limited to video cameras, lights, laser range finders, radios, night vision products, displays, and computers to communicate with each other and to communicate with external devices when mounted to a firearm.

The communication protocol makes use of the intelligent rail 107 described above, which supplies power from power source 103 to the electronic firearm devices. Because of the shared physical power connection in the intelligent rail 107, data can be shared reliably and securely between the electronic firearm devices. The communication method allows the firearm-mounted devices to interoperate, and through encrypted RF, communicate to remote devices. The medium of the intelligent rail 107 can be used to share data such as commands and controls, configurations, software updates, and sensor data, and also provides for remote operation. In one embodiment, a through-scope video camera communicates over the intelligent rail 107 to a controller module 400. The controller module 400 then uses a communication means, such as Wi-Fi, to communicate a live video stream to an external device 401, such as a smart phone.

Figure 18:
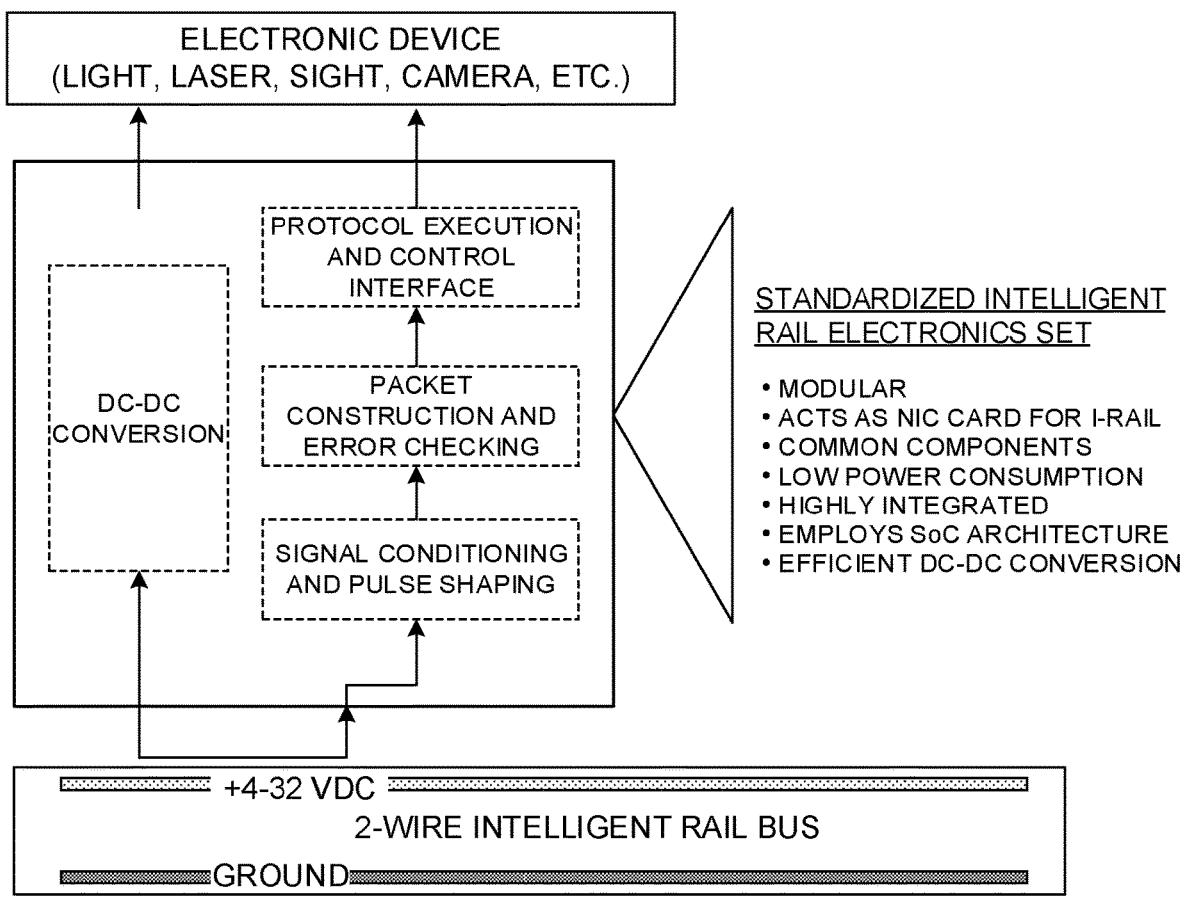
FIG. 18 is a schematic diagram that illustrates a secure and reliable packet based communication system.
Figure 19:
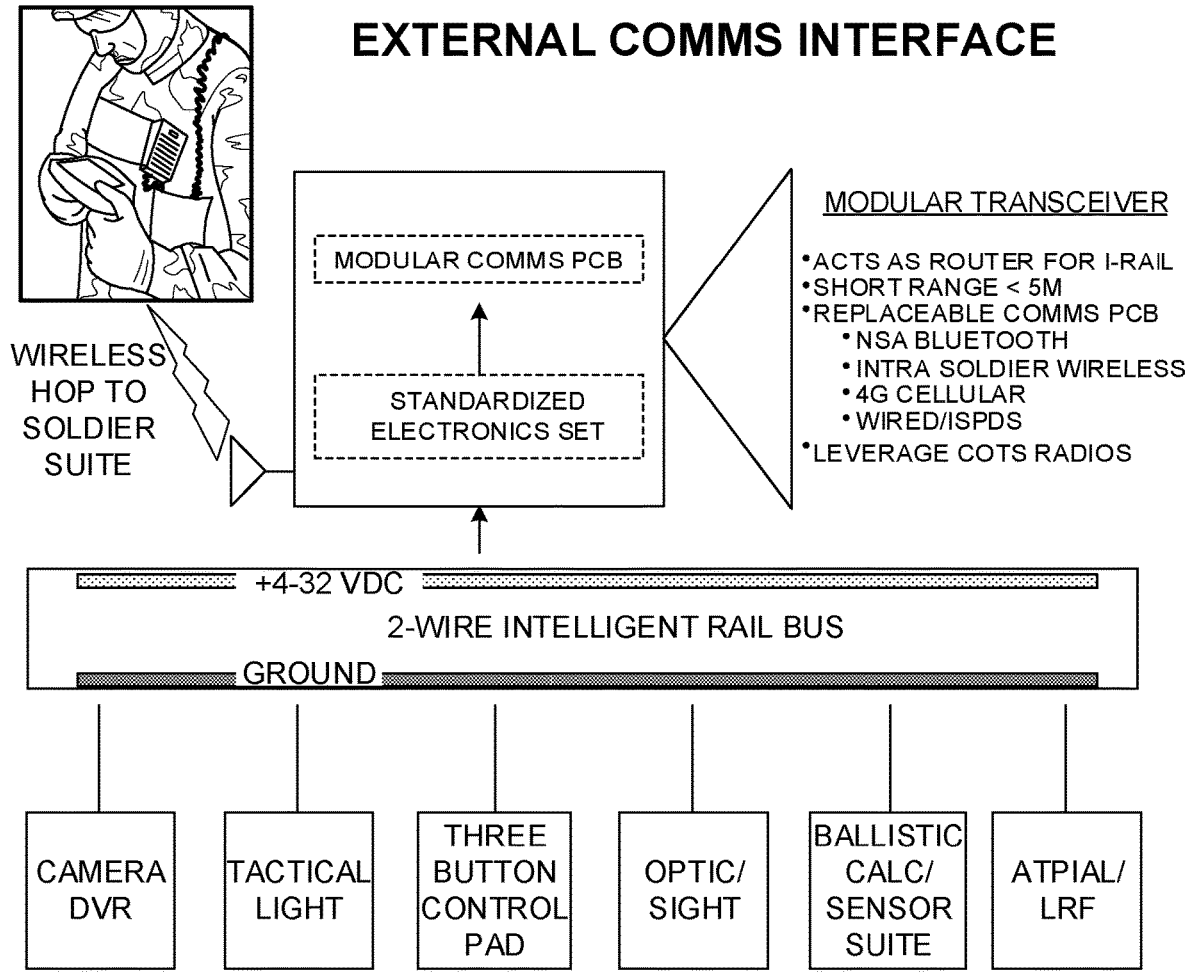
FIG. 19 is schematic diagram that illustrates an external communication interface.

FIG. 18 shows an architecture of the intelligent rail 107 that allows data to be transferred between electronic firearm devices mounted to the intelligent rail 107. FIG. 19 shows an external communication interface for the intelligent rail 107. In some embodiments the intelligent rail 107 superimposes (sums) two voltages including the static voltage that provides the power for powering the electronic firearm devices mounted to the intelligent rail 107, and a second dynamic, time-varying voltage that encodes and transfers data between the electronic firearm devices. In some examples, the (nominally) static voltage for power is coupled from the power source to nodes (i.e., electronic firearm devices), such as via one or more or a series of conductors or inductors. Further, in some examples, the dynamic (signal) voltage is coupled from node to node via a series of capacitors. The ability to transfer data on the intelligent rail 107 facilitates the networking of the electronic firearm devices, including interoperation of video capture and transmission devices.

Figure 20:
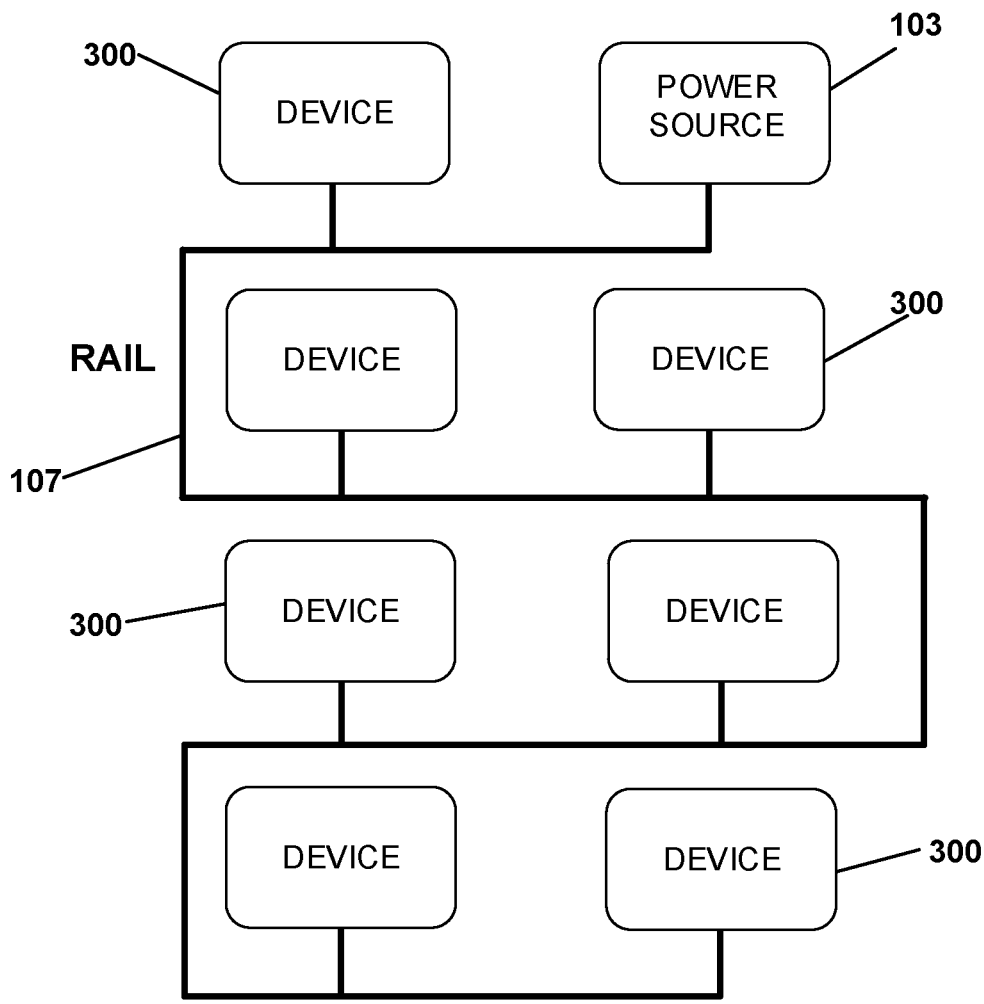
FIG. 20 is schematic diagram that illustrates the intelligent rail and electronic firearm devices connected thereto.

FIG. 20 shows a topology of the intelligent rail 107 and the electronic firearm devices 300 connected thereto. As described above, the power source 103 provides power to the electronic firearm devices 300 via the power distribution system 101. The electrical interconnection for each electronic firearm device 300 on the intelligent rail 107 is also used as the communication medium between each of the electronic firearm devices 300.

The communication protocol provides for full support of industry standard TCP/IP, UDP/IP, and ICMP/IP packet based communication protocols. The packet transmissions are "reliable" in that cyclic redundancy check (CRC) is used, and a sending device receives an acknowledgement packet from a receiving device. Packet retries are also supported. In one example, streaming video is supported using UDP/IP and the "sliding window protocol." Communications are secure using encryption and the network is scalable and extensible.

Figure 21:
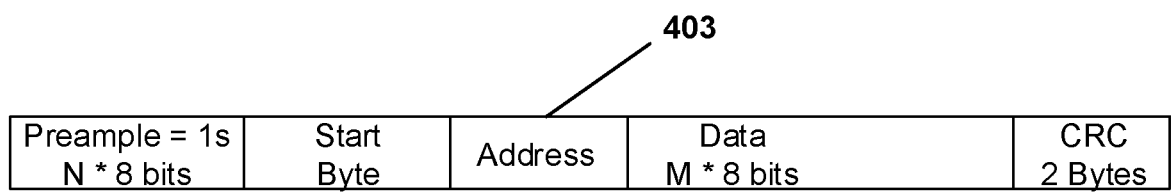
FIG. 21 is a schematic illustration of a packet structure of a communication protocol.

FIG. 21 shows the packet structure 403 of the communication protocol. The IP packets are encapsulated with a preamble (used to recover timing information) and a start byte for synchronization. Node address, packet length, and cyclic redundancy check (CRC) bytes are added to ensure reliable transmission.

The packet flow is as follows: industry standard IP packets are placed in a transmitter of a communication module of an electronic firearm device 300 by a microcontroller in the electronic firearm device 300. The communication module comprises a receiver and a transmitter. In one example, the receiver and the transmitter of the communication module are first in, first out (FIFO) components. The packet is then encapsulated with a preamble, start byte, node destination address, packet length, and CRC bytes. This forms a packet for communication between the electronic firearm devices 300 on the intelligent rail 107. The packet is then converted from bytes to bits, modulation encoded, and then broadcast over the intelligent rail 107 to all electronic firearm devices 300 connected thereto. In one embodiment, Manchester encoding is used as the modulation scheme.

The received packets are demodulated by each electronic firearm device 300 on the intelligent rail 107. Next, an electronic firearm device 300 determines if its address matches the destination address in the packet. If there is an address match, the electronic firearm device 300 converts the packet from bits to bytes, de-encapsulates the packet's header and CRC. The bytes are loaded into the receiver of the communication module of the electronic firearm device 300, and the device's microcontroller is notified. In one example embodiment, the packets are modulated and demodulated by each electronic firearm device 300 according to time-domain multiplexing techniques, but other methods such as frequency-division multiplexing and code division multiplexing or some combination of all the above may be employed.

Communication between electronic firearm devices 300 from different manufactures is accomplished by an established protocol standard. In one embodiment, JSON messages are used as the standard communication protocol between the electronic firearm devices. Where the firearm's communication channel is found to be unreliable or noisy, the packet encapsulation can be extended to include forward error correction (FEC), Viterbi decoding, and ECC. This communication method leverages industry standard Ethernet stack, supports collision detection with retransmission of packet, and provides timing recovery from packet data.

In one example, the communication method described above can be used for video collection and transmission by a video capture and transmission devices that are mounted to a firearm. By communicating on the intelligent rail 107, multiple video capture and transmission devices may be coordinated to deliver a multitude of video streams or to aggregate supplementary data into the video stream and/or to permit coordinated command and control of the video capture and transmission devices.

The intelligent rail 107 permits the use of video capture and transmission devices that can transmit video data externally. For example, this could be of particular value for the collection of and dissemination of video data from armed services or law enforcement. As an example, armed services or law enforcement may seek to gather reconnaissance data for various reasons such as for conducting operations, tactics, and/or combat.

Likewise, video data may be useful for historic records of events. A forward soldier or officer has a privileged position to witness vital information, and the ability to convey that information from his or her environment would provide a wealth of knowledge to peers and commanders. At the same time, the soldier or officer in the field of operation should not be unduly burdened with heavy and/or bulky video equipment. Thus, fitting on a firearm small, lightweight devices of video capture and transmission that are configured to communicate with an external device would provide significant advantages.

The intelligent rail 107 is a medium for digital data exchange between electronic firearm devices as well as a power supply for each device. This reduces the weight and bulk of each video capture and transmission device because each device does not need to have its own power source. The video data is digitized so that it may be compressed and exchanged efficiently with other devices on the intelligent rail 107 and externally to devices separate from the firearm via standardized networking protocols. Furthermore, digitization permits encryption of the data.

Use of the intelligent rail 107 further permits integration of command and control of the video capture and transmission devices by other devices operated by the firearm user, or even by remote operators such as those located at central command or headquarters.

Figure 22:
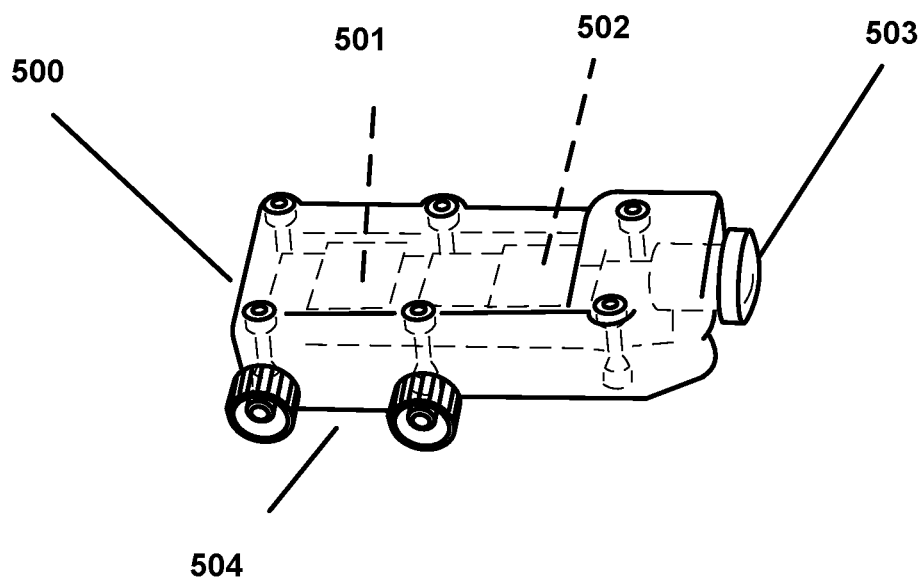
FIG. 22 is an isometric view of a camera node.

FIG. 22 depicts a camera node 500. The camera node 500 includes a lens and integrated image sensor 503, and microprocessors 502 which convert digital video data captured from the lens and integrated image sensor 503 into compressed digital data. The compressed digital data can be used for networked video streams, and in one example, the camera node 500 uses an H.264 for the encoder and MPEG-TS packetization.

A microcontroller and analog interface 501 transfers the compressed data from the camera node 500 to the intelligent rail 107, and transfers data from the intelligent rail 107 to the camera node 500 to control the operation of the camera node 500. The camera node 500 connects to the intelligent rail 107 physically using mechanical and electrical contacts 504.

Multiple camera nodes may be connected to the intelligent rail 107. For example, multiple camera nodes may be used to capture visible light, or infrared light for night vision. The multiple camera nodes may be positioned to aim along the rail of the firearm. Also, by the use of lenses, a camera node may capture an image directly from of the scope of the firearm.

Figure 23:
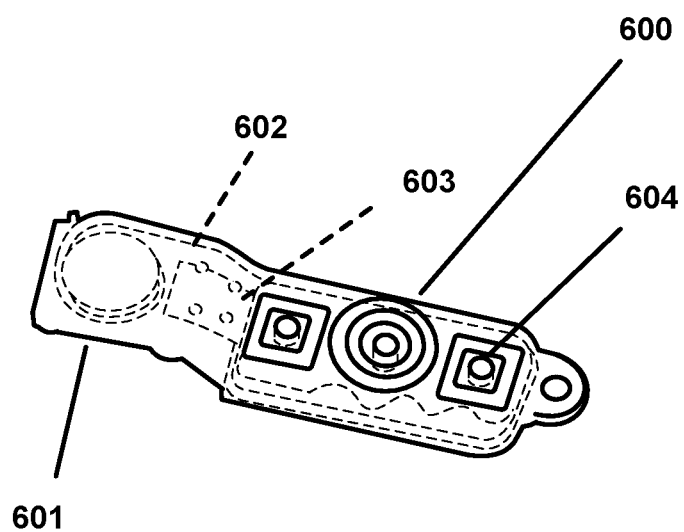
FIG. 23 is an isometric view of a controller node.

FIG. 23 depicts a controller node 600. The controller node 600 has operator buttons 604 and circuits 603 typical of the other electronic firearm devices connected to the intelligent rail 107, such as a microcontroller to operate the controller node 600 and an analog interface to the intelligent rail 107. The controller node 600 also includes mechanical and electrical interfaces 601 to mechanically and electrically connect the controller node 600 to the intelligent rail 107. The controller node 600 includes an RF (radio frequency) interface 602 which has an antenna and an RF transceiver. The RF interface 602 permits the transfer of data on and off the intelligent rail 107 with external networks. In one example, WiFi is used as an external network for transferring data from the intelligent rail 107 to an external device, such as a smartphone device.

The operation of the camera node 500 and the controller node 600 makes use of the communication protocol described above which utilizes packet transmissions. When power is applied to the intelligent rail 107, electronic firearm devices connected to the intelligent rail 107, including the camera node 500 and the controller node 600, establish network communications amongst themselves. Thus, when a firearm is configured with the intelligent rail 107, one or more camera nodes 500 and the controller node 600 can be operated by a user as follows.

The user can manipulate the operator buttons 604 to select which camera nodes 500 to activate. When activated, the one or more camera nodes 500 capture video data from the lens and integrated image sensor 503. Each of the one more camera nodes 500 convert the video data to digital video data, compress the digital video data according to industry-standard CODEC's, and encapsulate the digital video data into network packets. In one example, each of the one or more camera nodes 500 uses an H.264 for the encoder and MPEG-TS packetization.

The network packets are then transferred to the intelligent rail 107 via the network protocol described above. While the digital video data is being generated, other nodes (i.e., devices) on the intelligent rail 107 may be collecting other types of data, such as position of the user, the bearing of the firearm, range to target, timestamps, etc. This data can be sent from the collecting node (i.e., the device that captures this data) to the camera node 500 or to the controller node 600, where the data may be inserted into the video data stream.

In one example, Key-Length-Value (KLV) is used to embed the data from a collecting node into the video data stream. The data may be encrypted at the camera node 500, or the data may be encrypted at the controller node 600. In one example, encryption is done on the WiFi link using Advanced Encryption Standard (AES). Finally, the video data can be transferred from the intelligent rail 107 of the firearm through an RF interface on the controller node 600 so that the data can be sent to an external device, such as a smartphone device.

Figure 24:
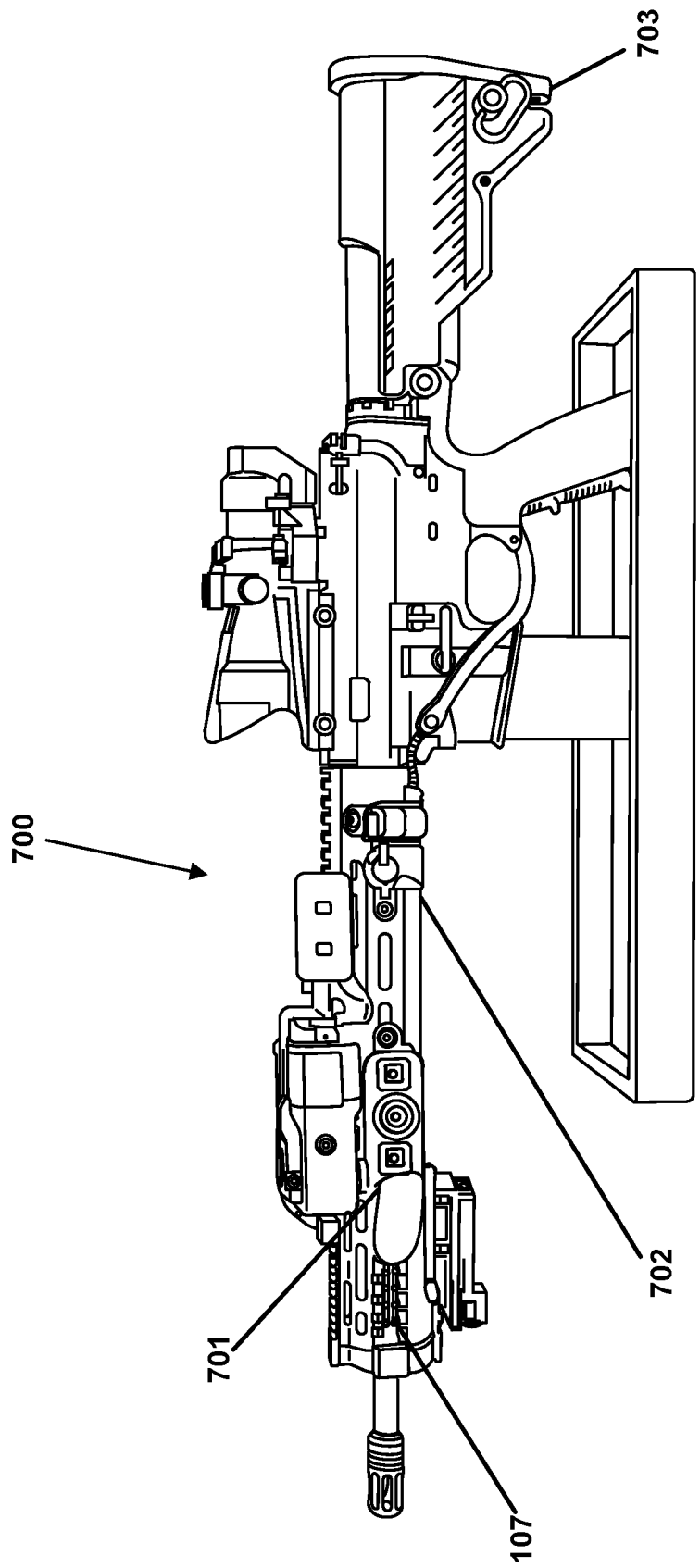
FIG. 24 is a side view of a firearm with the intelligent rail and electronic firearm devices mounted thereto.

FIGS. 24-27 show example implementations of the intelligent rail 107 on a firearm 700. In these examples, the firearm 700 is a carbine assault rifle, however, as discussed above, the intelligent rail 107 is not limited to rifles, and can be implemented on a variety of firearms including handguns. FIG. 24 shows the firearm 700 equipped with a 3-button control pad 701, a master on/off switch 702, and a battery pack 703 which is used in this example as the power source for powering an intelligent rail 107.

Figure 25:
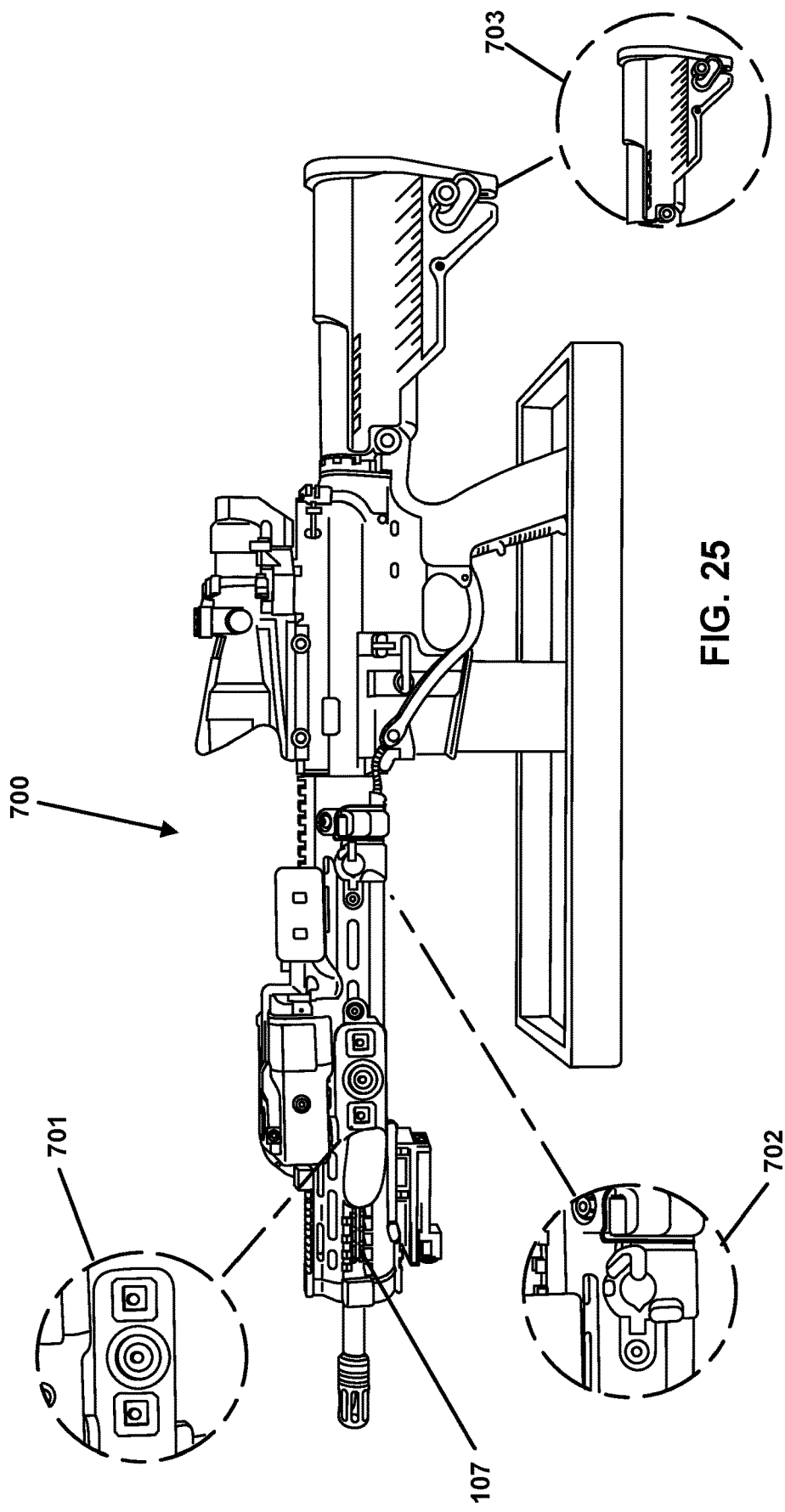
FIG. 25 is a side view of a firearm with the intelligent rail and electronic firearm devices mounted thereto.

FIG. 25 shows close-up views of the 3-button control pad 701 and the master on/off switch 702. The 3-button control pad 701 can be used by the firearm user to activate the one or more electronic devices mounted to the firearm 700 as well as to send data from the one or more electronic devices to an external device such as a smartphone device. The master on/off switch 702 is for turning on or off the intelligent rail 107, and hence, turning on or off the electronic devices mounted to the firearm 700.

Figure 26:
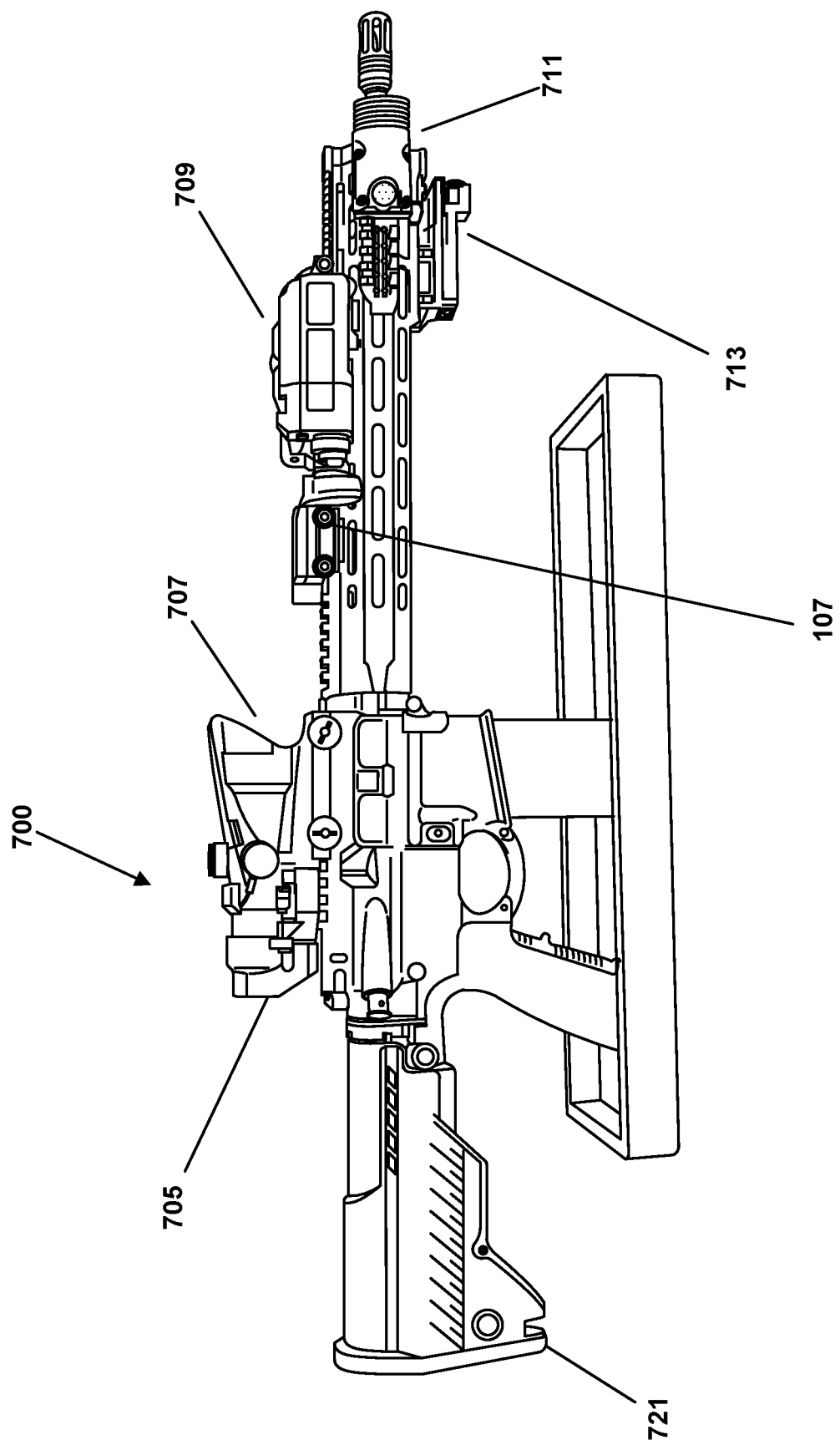
FIG. 26 is a side view of a firearm with the intelligent rail and electronic firearm devices mounted thereto.

FIG. 26 shows multiple electronic firearm devices can be mounted to the intelligent rail 107 on the firearm 700 having an adjustable buttstock 721. For example, electronic firearm devices such as a through-scope camera 705, an optic riflescope 707 such as an M150 ACOG 4×32, an aiming & range-finding laser 709, a white light 711, a wide-angle camera 713, etc. can be mounted to the intelligent rail 107 on the firearm 700.

Figure 27:
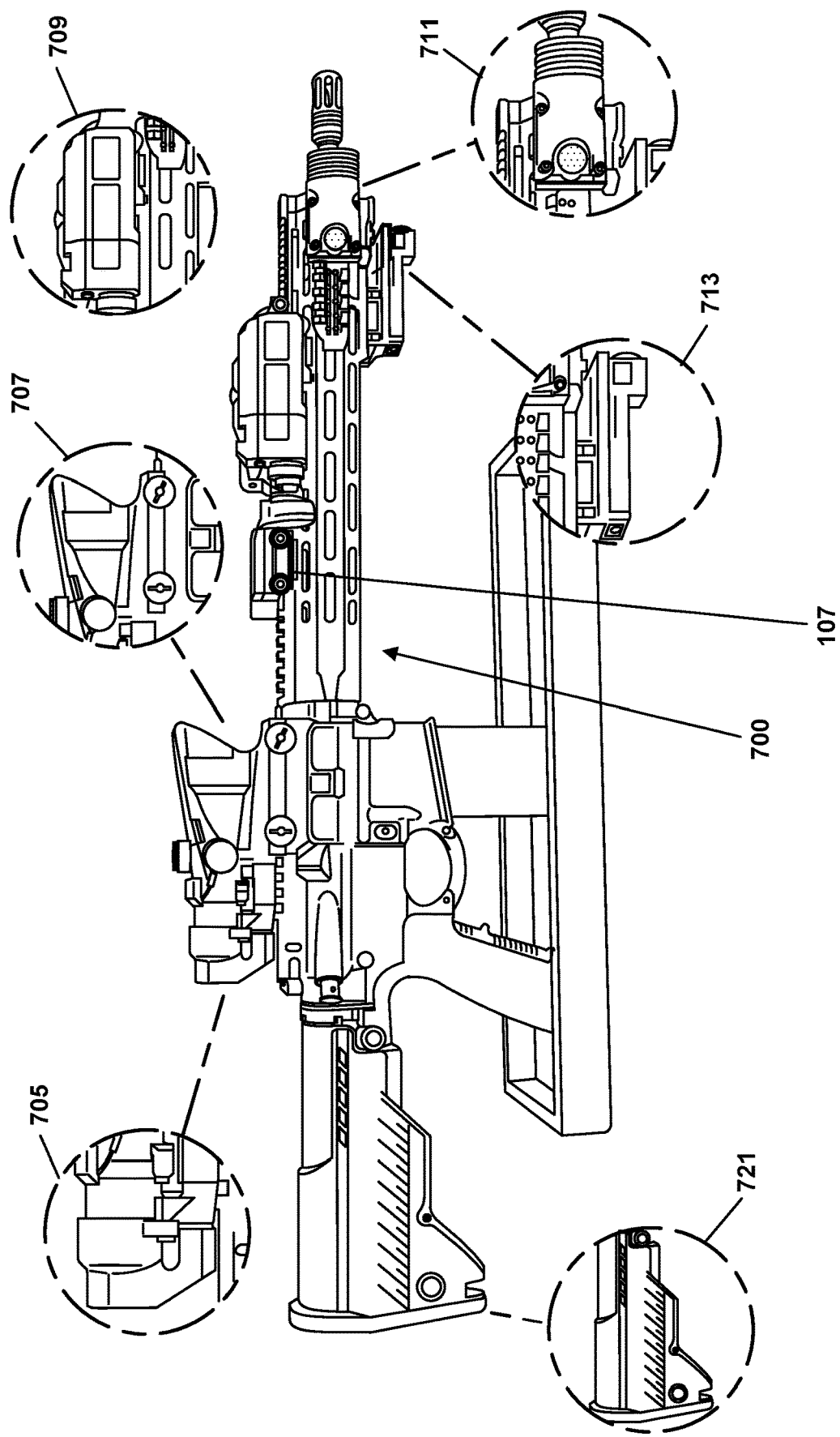
FIG. 27 is a side view of a firearm with the intelligent rail and electronic firearm devices mounted thereto.

FIG. 27 shows close-up views of the through-scope camera 705, the optic riflescope 707, the aiming & range-finding laser 709, the white light 711, and the wide-angle camera 713. The electronic firearm devices shown in FIGS. 26 and 27 are just some examples of the devices that can be mounted to the firearm 700 and it is intended that many more types of electronic firearm devices can be mounted to the intelligent rail 107 of the firearm 700.

Figure 28:
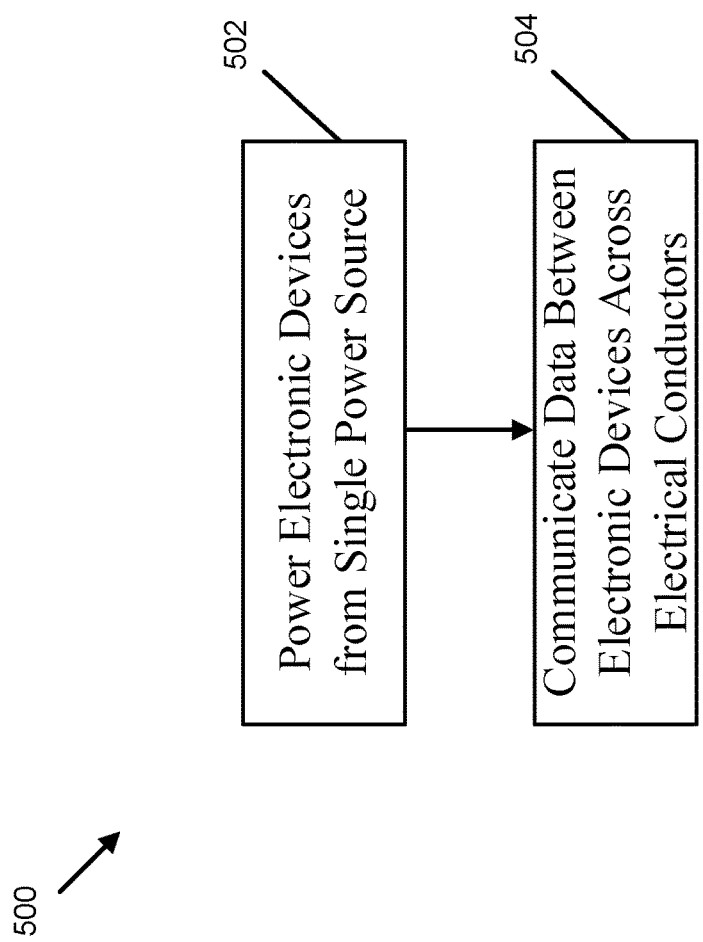
FIG. 28 illustrates a method of communicating between electronic devices connected to a firearm.

FIG. 28 illustrates a method 500 of communicating between electronic devices connected to a firearm. The method 500 includes a step 502 of powering a plurality of electronic devices connected to a firearm from a single power source through one or more electrical conductors. The method 500 further includes a step 504 of communicating data between the plurality of electronic devices across the one or more electrical conductors.

In some examples, the method 500 further includes communicating data from the one or more electrical conductors to an external device. In some examples, the data communicated to the external device is a video stream captured from a video camera connected to the firearm.

In some examples, the method 500 further includes embedding data from a first electronic device into a data stream of second electronic device. In some examples, the method 500 includes encapsulating the data in a packet structure of a communication protocol.

The various embodiments described above are provided by way of illustration only and should not be construed to limit the claims attached hereto. Those skilled in the art will readily recognize various modifications and changes that may be made without following the example embodiments and application illustrated and described herein, and without departing from the true spirit and scope of the following claims.

What is claimed is:

1. An electronic firearm accessory for mounting on an electronic system for a firearm, the electronic system comprising: a power source; an intelligent rail; one or more electrical conductors on the intelligent rail that are connected to receive power from the power source, wherein the intelligent rail delivers through the one or more electrical conductors a static voltage to supply power, and superimposes on the static voltage a dynamic, time-varying voltage to encode and transfer data, the electronic firearm accessory comprising:
    an electrical input configured to electrically connect to the one or more electrical conductors on the intelligent rail and to receive the power from the static voltage from the one or more electrical conductors on the intelligent rail; and
    a communication device configured for data communication via the dynamic, time-varying voltage across the one or more electrical conductors on the intelligent rail, wherein the data communication is packet-based utilizing a packet structure encapsulated with a preamble and a start byte for synchronization, and including a node address, packet length, and cyclic redundancy check bytes.

2. The electronic firearm accessory of claim 1, further comprising a rail attachment mechanism configured to attach the electronic firearm accessory to the intelligent rail.

3. The electronic firearm accessory of claim 1, further comprising at least one spring plunger configured to depress a switch on the intelligent rail to activate power delivery to the electrical input.

4. An electronic firearm accessory configured to be mounted to an intelligent rail system for a firearm, the intelligent rail system comprising a power source; an intelligent rail; and one or more electrical conductors electrically connected to receive power from the power source, at least part of the one or more electrical conductors being arranged on the intelligent rail, wherein the intelligent rail delivers through the one or more electrical conductors a static voltage to supply power, and superimposes on the static voltage a dynamic, time-varying voltage to encode and transfer data, wherein the electronic firearm accessory comprises:
    an electrical input configured to receive the power from the static voltage from the one or more electrical conductors to power the electronic device; and
    a communication device configured for data communication via the dynamic, time-varying voltage across the one or more electrical conductors, wherein the data communication is packet-based utilizing a packet structure encapsulated with a preamble and a start byte for synchronization, and including a node address, packet length, and cyclic redundancy check bytes, and wherein the communication device is configured to modulation encode the packet structure, and broadcast the packet structure over the intelligent rail to another electronic device mounted to the intelligent rail system.

5. The electronic firearm accessory of claim 4, wherein the electronic firearm accessory is further configured to communicate with a portable electronic device using the data communication over the intelligent rail.

6. An electronic firearm accessory comprising:
    an electrical input configured to receive power from one or more electrical conductors of an accessory mount for a firearm; and
    a communication device configured for data communication via a dynamic, time-varying voltage superimposed on an otherwise static power signal on the one or more electrical conductors of the accessory mount, wherein the data communication utilizes a packet structure with a start indicator, a node address, packet data, and error correction bytes.

7. The electronic firearm accessory of claim 6, wherein the communication device is configured to modulation encode the packet structure, and broadcast the packet structure over the intelligent rail to another electronic device mounted to the intelligent rail.

8. The electronic firearm accessory of claim 6, further comprising a spring plunger configured to depress a switch on the intelligent rail.

9. The electronic firearm accessory of claim 8, further comprising spring contacts configured to make contact with electrical contacts of the accessory mount, the electrical contacts being electrically connected to the one or more electrical conductors when the switch is depressed.

10. The electronic firearm accessory of claim 9, further comprising face seals configured to provide environmental protection around the spring contacts.

11. The electronic firearm accessory of claim 9, further comprising face seals configured to enclose the electrical contacts and spring contacts between the electronic firearm accessory and the accessory mount when the electronic firearm accessory is mounted on the accessory mount.

12. The electronic firearm accessory of claim 6, further comprising a power-consuming component configured to be powered by the static power signal received from the one or more electrical conductors.

13. The electronic firearm accessory of claim 12, wherein the power-consuming component is a light.

14. The electronic firearm accessory of claim 12, wherein the power-consuming component is a camera.

15. The electronic firearm accessory of claim 12, wherein the power consuming component is a laser range finder.

16. The electronic firearm accessory of claim 12, wherein the power consuming component is an infrared sensor.

17. The electronic firearm accessory of claim 12, wherein the power consuming component is a display.

18. The electronic firearm accessory of claim 12, wherein the power consuming component is a radio.

19. The electronic firearm accessory of claim 6, further comprising a rail attachment mechanism configured to attach the electronic firearm accessory to a rail of the accessory mount.

20. A method of operating an electronic firearm accessory, the method comprising:
   receiving power at one or more electrical contacts of the electronic firearm accessory from one or more electrical conductors of a rail system for a firearm;
   using the electronic firearm accessory to communicate data with another electronic device across the one or more electrical conductors of the rail system via a dynamic, time-varying voltage, including:
      utilizing a packet-based communication protocol that includes a packet structure encapsulated with a start indicator, a node address, packet data, and error correction bytes;
      encoding the packet structure; and
      broadcasting the packet structure by superimposing the dynamic, time-varying voltage encoding the packet structure onto a power signal on the one or more electrical conductors of the rail system.

21. The method of claim 20, wherein encoding the packet structure utilizes Manchester encoding.

22. The method of claim 20, wherein the electronic firearm accessory comprises a video camera, and wherein the data communicated to another electronic device includes at least a portion of a video stream from the video camera.

* * * * *